US012688471B2

(12) United States Patent
Holland et al.

(10) Patent No.: US 12,688,471 B2
(45) Date of Patent: Jul. 21, 2026

(54) CUSTOMIZING MAPPING INTERFACES USING CONTEMPORANEOUS DEVICE REQUEST DATA IN RESPONSE TO APPLICATION INTERACTIONS

(71) Applicant: Lyft, Inc., San Francisco, CA (US)

(72) Inventors: Robert Morgan Holland, Shelburne, VT (US); Joshua James Ketellapper, San Francisco, CA (US); Peiti Li, Bellevue, WA (US); Seven Shurygin, San Francisco, CA (US); Xing Xing, Fremont, CA (US); Sizhu Zong, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 19/313,220

(22) Filed: Aug. 28, 2025

(65) Prior Publication Data

US 2025/0390803 A1     Dec. 25, 2025

Related U.S. Application Data

(63) Continuation of application No. 16/834,658, filed on Mar. 30, 2020, now abandoned.

(51) Int. Cl.
*G06Q 10/02* (2012.01)
*G06Q 30/0208* (2023.01)
(Continued)

(52) U.S. Cl.
CPC ......... *G06Q 10/02* (2013.01); *G06Q 30/0208* (2013.01); *G06Q 50/40* (2024.01);
(Continued)

(58) Field of Classification Search
CPC ........................ G01C 21/3679; G01C 21/3682
See application file for complete search history.

(56) References Cited

U.S. PATENT DOCUMENTS 9,104,293 B1     8/2015 Kornfeld et al.
10,979,863 B2     4/2021 Zhang et al.
(Continued)

FOREIGN PATENT DOCUMENTS

KR     20150053850 A     5/2015

OTHER PUBLICATIONS

Chen, Yan-Ying et al.; "Travel Recommendation by Mining People Attributes and Travel Group Types From Community-Contributed Photos"; Published Oct. 2013; IEEE Transactions on Multimedia, vol. 15, No. 6, pp. 1283-1295 (Year: 2013).*
(Continued)

*Primary Examiner* — Emmett K. Walsh
*Assistant Examiner* — Michael C Moroney
(74) *Attorney, Agent, or Firm* — Keller Preece PLLC

(57) ABSTRACT

This disclosure covers computer-implemented methods, non-transitory computer readable media, and systems that efficiently determine and present real-time (or near-real time) trending destination locations in a graphical user interface of a requester device based on transportation requests or other transportation data tracked for a geographic region. For example, the disclosed systems identify destination locations from within a geographic region of a particular requester by analyzing transportation requests received within a threshold time period of a requester's current reference time. The disclosed systems dynamically determine a set of trending destination locations from the destination locations based on such transportation requests to the destination locations within the threshold time period. Having determined a set of trending destination locations, the disclosed systems provide a selectable option for real-time (or near-real-time) trending destination locations relevant to the requester for display within a graphical user interface of the requester's device.

20 Claims, 17 Drawing Sheets

(51) Int. Cl.

| | | |
|---|---|---|
| *G06Q 50/40* | (2024.01) | |
| *H04W 4/021* | (2018.01) | |
| *H04W 4/029* | (2018.01) | |
| *H04W 4/40* | (2018.01) | |

(52) U.S. Cl.

CPC ........... *H04W 4/021* (2013.01); *H04W 4/029* (2018.02); *H04W 4/40* (2018.02)

(56) References Cited

U.S. PATENT DOCUMENTS

| | | | |
|---|---|---|---|
| 11,205,240 | B2 | 12/2021 | Urmson et al. |
| 2010/0070165 | A1* | 3/2010 | Kang ................. G01C 21/3679 701/533 |
| 2010/0257163 | A1* | 10/2010 | Ohazama ........... G06F 16/9537 707/E17.074 |
| 2011/0301985 | A1 | 12/2011 | Camp et al. |
| 2012/0303272 | A1 | 11/2012 | Studzinski |
| 2015/0117796 | A1 | 4/2015 | Hile et al. |
| 2015/0248689 | A1 | 9/2015 | Paul et al. |
| 2017/0108348 | A1 | 4/2017 | Hansen et al. |
| 2017/0236235 | A1* | 8/2017 | Frankert ................ H04B 1/713 705/13 |
| 2017/0256012 | A1 | 9/2017 | Buzalja et al. |
| 2018/0017400 | A1 | 1/2018 | Andrew |
| 2018/0058863 | A1 | 3/2018 | Meyer et al. |
| 2018/0089784 | A1 | 3/2018 | Yamashita et al. |
| 2018/0181910 | A1* | 6/2018 | Zhang .................... G06Q 50/40 |
| 2018/0188058 | A1* | 7/2018 | Dabholkar ......... G01C 21/3617 |
| 2018/0189919 | A1 | 7/2018 | Brendlinger et al. |
| 2018/0202822 | A1* | 7/2018 | DeLizio ............. G06Q 30/0645 |
| 2018/0268324 | A1 | 9/2018 | Zhang et al. |
| 2019/0017839 | A1 | 1/2019 | Eyler et al. |
| 2019/0163204 | A1* | 5/2019 | Bai ...................... G06Q 10/047 |
| 2019/0226863 | A1* | 7/2019 | Anastasia .......... G06Q 30/0283 |
| 2020/0004842 | A1* | 1/2020 | Fateem .............. G06F 3/04842 |
| 2020/0033144 | A1 | 1/2020 | Du et al. |
| 2020/0041301 | A1 | 2/2020 | Jalasutram et al. |
| 2020/0104962 | A1 | 4/2020 | Aich et al. |
| 2020/0209013 | A1 | 7/2020 | Kornev et al. |
| 2020/0226498 | A1 | 7/2020 | Jiwani et al. |
| 2021/0035059 | A1* | 2/2021 | Atwood ............. G06Q 10/0831 |
| 2021/0042772 | A1* | 2/2021 | Liu ......................... G06N 20/00 |
| 2021/0043086 | A1* | 2/2021 | Chen ........................ G06N 5/01 |
| 2021/0049224 | A1* | 2/2021 | Zheng ................... G06F 16/909 |
| 2021/0201212 | A1 | 7/2021 | Tang et al. |
| 2021/0239486 | A1* | 8/2021 | Liang ................. G06F 16/9537 |
| 2021/0278224 | A1 | 9/2021 | Davis et al. |
| 2022/0083925 | A1 | 3/2022 | Varadarajan et al. |

OTHER PUBLICATIONS

Liu, Yudan & Ge, Kaikai & Zhang, Xu & Lin, Leyu. (2019). Real-time Attention Based Look-alike Model for Recommender System. KDD 2019: Proceedings of the 25th ACM SIGKDD International Conference on Knowledge Discovery & Data Mining Jul. 2019. pp. 2765-2773; https://doi.org/10.1145/3292500.3330707.

Wikipedia, the free encyclopedia; "Collaborative filtering"; Date downloaded Jul. 19, 2020; https://en.wikipedia.org/wiki/Collaborative_filtering.

Larson, Selena; "Uber is turning your friends' phones into destinations"; published Nov. 2, 2016, accessed as of Jun. 14, 2017; CNN; pp. 1-3; https://money.cnn.com/2016/11/02/technology/uber-update-rider-app/ (Year: 2017).

U.S. Appl. No. 16/834,658, May 24, 2023, Office Action.
U.S. Appl. No. 16/834,658, Dec. 22, 2023, Office Action.
U.S. Appl. No. 16/834,658, Jun. 21, 2024, Office Action.
U.S. Appl. No. 16/834,658, Dec. 31, 2024, Office Action.
U.S. Appl. No. 16/834,658, May 1, 2025, Office Action.

* cited by examiner

600

602

614

You saved $5.00 on your ride because you made a purchase at Clothing Shop 1.

Done

1000

1002
Receiving An Indication Of A Requester Location

1004
Identifying Destination Locations Of Recent Transportation Requests

1006
Determining A Set Of Trending Destination Locations From The Destination Locations 1008
Providing A Selectable Option For A Trending Destination Location

1200

Transportation Matching
System
*1202*

1210

Vehicle Subsystem *1208*

Network
*1204*

Client System *1206*

CUSTOMIZING MAPPING INTERFACES USING CONTEMPORANEOUS DEVICE REQUEST DATA IN RESPONSE TO APPLICATION INTERACTIONS

CROSS-REFERENCE TO RELATED APPLICATIONS

The present application is a continuation of U.S. application Ser. No. 16/834,658, filed on Mar. 30, 2020. The aforementioned application is hereby incorporated by reference in its entirety.

BACKGROUND

In recent years, on-demand transportation matching systems have significantly grown in popularity and increasingly facilitated network traffic for request and transport in various locations. Indeed, the proliferation of web and mobile applications enable requesting individuals to request transportation from one geographic area to another geographic area. For instance, on-demand transportation matching systems can receive transportation requests and pair the requests with providers that can transport requesting individuals in vehicles to the destination locations. Such on-demand transportation matching systems provide software-application tools to providers to pick up requesting individuals as well as transport them to the destination locations.

Although conventional on-demand transportation matching systems can provide transportation for individuals based on transportation requests, some conventional systems rigidly and inefficiently limit functions of mobile or other applications that isolate such applications on computing devices. For example, conventional on-demand transportation matching systems typically utilize standalone applications with a specific set of functionalities related to requesting and providing transportation. Because the applications are highly specialized for a specific purpose, such conventional systems often require users to utilize other software applications to perform other functionalities that are either unrelated or tangentially related to on-demand transportation requests. Thus, conventional systems can use rigid transportation-request processes with limited transportation options that push computing devices to use more hardware resources for additional applications (e.g., for storage space, processing power) to perform a varied set of operations.

In addition to isolated and limited-function on-demand transportation applications, some computing devices use location tracking systems to determine current or past locations of such devices. But conventional location tracking systems often imprecisely detect the location of such user devices. Specifically, conventional systems typically use techniques that detect user locations based on Global Positioning System ("GPS") information or wireless connectivity of user devices. Conventional GPS-based location tracking systems often generate or receive noisy GPS data indicating incorrect locations of a computing device at an initial location, along a route, or at a destination. Such GPS data may incorrectly indicate a person or vehicle is jumping between locations or at different locations contrary to standard movement patterns or the laws of physics. Additionally, wireless-connectivity-based location data merely indicates a general location within which a device is located based on a device connecting to wireless devices that provide connectivity data to the conventional systems. While such conventional location tracking techniques have improved in accuracy, such systems still estimate users' current and previous locations with limited accuracy. By failing to determine user locations with high accuracy, conventional GPS-based or wireless-connectivity-based location tracking systems can cause on-demand transportation matching systems or other processes to output inaccurate routing or other functions.

To help overcome some inaccuracies of GPS-based or estimated location tracking, some conventional systems further utilize explicit user input to inform the estimated location tracking. For instance, some conventional systems allow users to provide "check-in" messages that indicate exact locations of users at specific times. Such conventional systems can further utilize search history information to inform the estimated location tracking. But such systems can still result in inaccurate location tracking for users, because the available location data is limited to only a portion of users that participate in such data-sharing programs. Accordingly, conventional location tracking systems and other systems that rely on conventional location tracking often produce inaccurate location estimations.

SUMMARY

This disclosure describes one or more embodiments of systems, methods, and non-transitory computer readable media that solve the foregoing problems and provide other benefits. In particular, the disclosed systems can efficiently determine and present real-time (or near-real-time) trending destination locations in a graphical user interface of a requester device based on transportation requests or other transportation data tracked for a geographic region. For example, the disclosed systems can identify destination locations from within a geographic region of a particular requester by analyzing transportation requests received within a threshold time period of a requester's current reference time. The disclosed systems can also dynamically determine a set of trending destination locations from the destination locations based on transportation requests to the destination locations within the threshold time period. Having determined a set of trending destination locations, the disclosed systems can provide a selectable option for real-time (or near-real-time) trending destination locations relevant to the requester for display within a graphical user interface of the requester's device.

BRIEF DESCRIPTION OF THE DRAWINGS

The detailed description refers to the drawings briefly described below.

DETAILED DESCRIPTION

Figure 1:
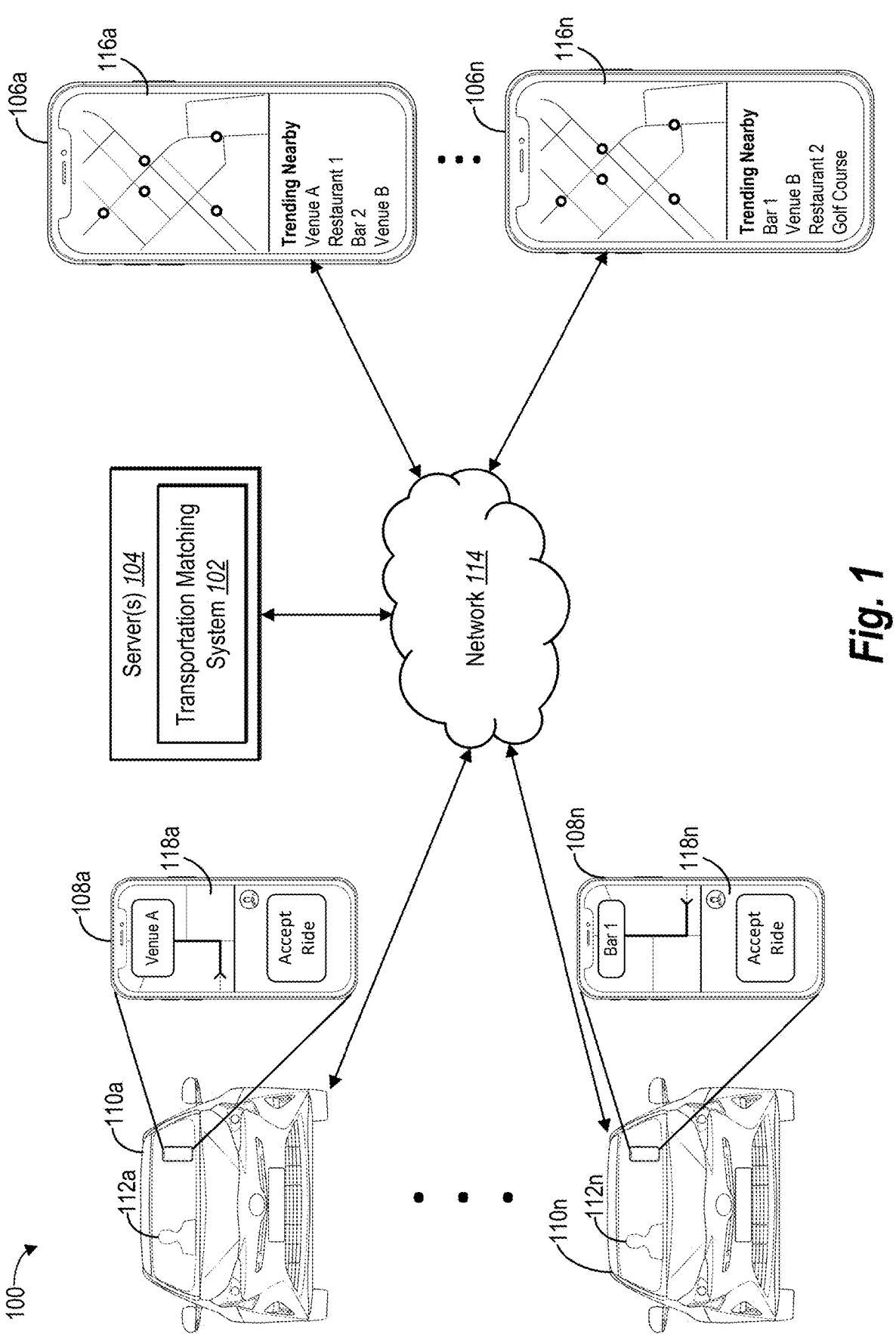
FIG. 1 illustrates a block diagram of an environment for implementing a transportation matching system in accordance with one or more embodiments.

This disclosure describes one or more embodiments of a transportation matching system that efficiently determines and presents real-time (or near-real time) trending destination locations in a graphical user interface of a requester device based on transportation requests or other transportation data tracked for a geographic region. For example, the transportation matching system can identify transportation requests from requester devices to destination locations within a geographic region corresponding to a location of a particular requester. The transportation matching system can use the destination locations to determine a set of trending destination locations within the geographic region relevant to the requester. By utilizing an algorithm or classification model described below, in some cases, the transportation destination system determines such trending destination locations based on a number of recent transportation requests or transportations to each identified destination location and can customize such locations by category or by a requester's transportation history.

After determining the set of trending destination locations, the transportation matching system can provide a selectable option for a trending destination location to a requester device for displaying, selecting, or otherwise interacting with the trending destination locations. Upon detecting selection by a requester of a selectable option for a trending destination location, for instance, the requester device can initiate a transportation request to the trending destination location. By providing trending destinations based on real-time (or near-real time) transportation requests or other transportation data, the transportation matching system can efficiently, accurately, and flexibly determine and provide trending destination locations to assist requesters in initiating transportation requests.

In one or more embodiments, the transportation matching system receives an indication of a requester location for a requester. For example, the transportation matching system can identify the requester location based on location data received from a requester device associated with the requester. The requester location can indicate a current location of the requester or a future location of the requester. The transportation system can use the requester location to determine a geographic region for determining trending destination locations that are relevant to the requester.

Based on determining the geographic region corresponding to the requester location, for instance, the transportation matching system can identify destination locations of recent transportation requests received by the system within the geographic region. For instance, the transportation matching system can identify destination locations within the geographic region of a requester's location from transportation requests received within a specific time period relative to a current reference time for the requester. The transportation matching system can thus identify recent locations to which other requesters are traveling (or destination locations of transportation requests) occurring within the geographic region.

The transportation matching system can utilize information about the recent destination locations within the geographic region to determine trending destination locations for the requester. In one or more embodiments, the transportation matching system can determine the trending destination locations based on a count of transportation requests to each destination location within the specified time range. Such a tally may include a count of transportations within the specified time range to each destination location within the geographic region.

In one or more embodiments, the transportation matching system can customize trending destination locations for a requester based on a transportation history, a profile associated with the requester, and/or specific location categories. For example, the transportation matching system can determine trending destination locations that may be of interest to the requester based on previous destination locations that the requester has visited. Additionally, the transportation matching system can customize trending destination locations for the requester based on preferences of location categories of interest to the requester indicated explicitly by the requester or inferred from the preferences.

In addition or in the alternative to counting transportation requests, in some embodiments, the transportation matching system utilizes a classification model to categorize and rank the destination locations within a geographic region based on characteristics of the destination locations and/or characteristics, interests, or transportation history of the requester. Such a classification model may include, for instance, a neural network, a k-nearest-neighbors algorithm, or a singular value decomposition model. The transportation matching system can thus determine a set of trending destination locations relevant to a requester based on real-time (or near-real-time) transportation data of a number of transportation requests to destinations within a specific region.

After determining a set of trending destination locations for a requester, the transportation matching system can provide the trending destinations to a requester device. For example, in one or more embodiments, the transportation matching system can provide to the requester device data representing a selectable option for a trending destination location from among the set of trending destination locations. Upon detecting selection by a requester of such a selectable option for the trending destination location, the requester device can initiate a transportation request to the trending destination location. In addition to the selectable option, the transportation matching system can cause the requester device to display the set of trending destination locations in a list, within a map, or otherwise within a graphical user interface. In some cases, the transportation matching system also provides data for additional information and/or interactive options to the requester options for the trending destination locations in connection with initiating a transportation request for the requester.

In addition to (or as part of) trending destination locations, in some embodiments, the transportation matching system also provides information for locations sponsored by merchants as destinations. For instance, the transportation matching system can provide an interface (e.g., an application program interface) by which merchants can integrate to become sponsored merchants. The transportation matching system can then display specific sponsored merchant locations to requester devices along with (or as part of) trending destination locations. According to one or more embodiments, the transportation matching system can also provide an indicator of a transportation incentive for display within a graphical user interface of the requester device for the requester to travel to the location of the sponsored merchant.

In addition to determining trending destination locations within a geographic region for a given requester, the transportation matching system can also utilize information about one or more additional requesters to determine trending destination locations and fulfill transportation requests. For example, in some cases, the transportation matching system determines trending destination locations based on characteristics, interests, or transportation history of an additional requester, such as an additional requester linked to (or in a group with) an initial requester through requester applications of the transportation matching system. The transportation matching system can also provide a requester-designated destination location to one or more additional requesters, such as a current location of the requester or a target location selected by the requester. Additionally, or alternatively, the transportation matching system can send a vehicle-transportation request to a provider device to transport the additional requester to the requester-designated destination location in response to the additional requester selecting the requester-designated destination location.

As previously mentioned, the disclosed transportation matching system provides a variety of advantages over conventional on-demand transportation matching systems. In particular, the transportation matching system improves the accuracy of computing systems that identify popular locations in a given time frame, particularly recent destinations in real time or near-real time. As suggested above, conventional location tracking systems rely on noisy GPS data or estimated location tracking to identify locations of computing devices. By using such conventional GPS tracking or predictive location tracking, conventional mapping or search engines can merely estimate with limited accuracy the locations to which users and their computing devices travel—particularly for locations with dense concentrations of different eating establishments, venues, or other businesses (e.g., in regions or quarters of New York City or San Francisco). A set of popular destinations based on such GPS data or estimated location tracking such as wireless-connectivity is inherently inaccurate and may lack recent data to correct for such inaccuracies.

In contrast to such conventional systems, the transportation matching system can accurately determine trending destination locations from destinations of transportation requests within a threshold time period of a requester's time by reference, such as real-time or near-real time determinations. By using explicitly indicated location information from transportation requests for which requesters are transported to destination locations, the transportation matching system can verify the accuracy of location data by identifying requester-specified locations as a basis for trending destination locations. In addition to such requester-specified locations from requester devices, in some cases, the transportation matching system can further ensure and compare the accuracy of destination locations with transportation data received from provider devices fulfilling the transportation requests (e.g., provider confirmed drop-off locations from provider devices, GPS data, wireless location data). In some cases, the transportation matching system can use more than one source to verify the accuracy of the location data, resulting in a higher degree of accuracy in identifying destination locations as a basis for trending destination locations.

In addition to improving accuracy, in some cases, the transportation matching system also improves the flexibility and efficiency with which conventional on-demand transportation matching systems (or conventional navigation systems) provide transportation options. As suggested above, conventional on-demand transportation matching systems often rigidly limit functions of applications to transportation requests and pairing requesters with providers—without accounting for tracked transportation requests or popular destinations from other, separate software applications. A requester using such conventional systems accordingly navigates between an application from a conventional navigation system (or search-engine system) and another application from a conventional transportation matching system with limited functions to separately identify popular destinations—albeit with less accuracy and without current real time or near-real time data—and request transportation to such popular destinations.

By determining and providing accurate trending destination locations to requesters along with options to initiate transportation requests to such trending destination locations from a single application, the transportation matching system creates a more flexible and multi-functional application than conventional isolated applications. In contrast to conventional systems, the transportation matching system provides a variety of functionalities related to digital mapping, location tracking, and transportation matching—without requiring requesters to access different applications and corresponding different graphical user interfaces. The transportation matching system can also reduce the number of user actions to access information and perform operations related to finding destination locations and requesting transportation within a single application and its corresponding user interface. Rather than users navigating between multiple user interfaces in a conventional application, the disclosed transportation matching systems provides trending destinations and selectable options to request transportation to such destinations in a single application—thereby avoiding navigation across applications and corresponding user interactions from a requester with a computing device.

In addition to improved flexibility and integration, in some cases, the transportation matching system also improves the efficiency with which conventional on-demand transportation matching systems process transportation requests for more than one requester. By utilizing information about two or more requesters in a group to provide trending destination locations that are relevant to each member of the group, the disclosed transportation matching system can assist requesters in traveling to a specific destination location. For instance, in some embodiments, the disclosed transportation matching system dispatches provider vehicles to transport requesters at different locations upon various providers accepting individual transportation requests of a group transportation request from a single requester device. The transportation matching system can thus improve efficiency by reducing the number of devices involved in such transportation requests while also ensuring that requesters arrive at a destination location at approximately the same time.

As illustrated by the foregoing discussion, the present disclosure utilizes a variety of terms to describe features and advantages of the transportation matching system. Additional detail is now provided regarding the meaning of such terms. For example, as used herein, the term "transportation matching system" refers to a computer-implemented system that matches transportation providers with transportation requests of requester devices. In particular, a transportation matching system can communicate with requester devices associated with requesters of transportation and provider devices associated with providers of transportation. The transportation matching system can use location information and availability information, for example, from provider devices to match the provider devices to transportation requests received from requester devices.

Relatedly, the term "transportation request" refers to a request by a requester for transport by a vehicle. In particular, a transportation request includes a request for a provider vehicle to transport a requester or a group of individuals from one geographic area to another geographic area. A transportation request can include information such as a pickup location, a destination location (e.g., a location to which the requester wishes to travel), a request location (e.g., a location from which the transportation request is initiated), location profile information, a requester rating, or a travel history. As an example of such information, a transportation request may include an address as a destination location and the requester's current location as the pickup location.

As indicated above, the term "destination location" refers to a location to which a requester is transported or going to be transported. For instance, a destination location can refer to an address or location at which a transportation provider drops a requester off. A destination location may also include a location to which a requester requests transport using a requester device.

As used herein, the term "requester" refers to a person who requests (or who is projected to request) a ride or other form of transportation and/or a person who interacts with a requester device. For instance, a requester includes a person who interacts with a requester device to send a transportation request to a transportation matching system. A requester may likewise refer to a person who requests a ride or other form of transportation but who is still waiting for pickup. A requester may also refer to a person whom a provider vehicle has picked up and who is currently riding within the provider vehicle to a destination location (e.g., a destination location indicated by a requester).

As used herein, the term "requester device" refers to a computing device associated with a requester and that allows the requester to send a transportation request. A requester device can include a mobile device such as a laptop, smartphone, or tablet associated with a requester. A requester device can include an application comprising instructions that (upon execution) cause the requester device to perform various actions for a transportation matching system as described herein. Such an application may include web browsers, applets, or other software applications (e.g., native applications).

As used herein, the term "provider device" refers to a computing device associated with a provider or a provider vehicle (e.g., which allows the provider to receive transportation requests). For example, a provider device may refer to a separate mobile device, such as a laptop, smartphone, or tablet associated with the provider vehicle. A provider can interact with the provider device to accept transportation requests matched to a provider device and fulfill the transportation requests using a provider vehicle.

As used herein, the term "provider vehicle" refers to a vehicle that transports (or can transport) a requester from a pick-up location to a destination location. A provider vehicle can include a vehicle driven by a transportation provider (or simply "provider"), which is a human operator. A provider vehicle can also include an autonomous vehicle—that is, a self-driving vehicle that includes computer components and accompanying sensors for driving without manual-provider input from a human operator. When a provider vehicle is an autonomous vehicle, the provider vehicle may include additional components such as location components, one or more sensors by which the autonomous vehicle navigates, and/or other components necessary to navigate without a human operator (or with minimal interactions by a human operator).

As used herein, the term "trending destination location" refers to a destination location corresponding to one or more transportation requests received within a threshold time period relative to a current reference time. For example, a trending destination location can include a destination location that satisfies a threshold number of transportations or transportation requests within a specific time period of the current reference time. As an example, a trending destination location can include a destination location to which a minimum number of people have traveled within 30 minutes, an hour, day, etc. within a current reference time. In one or more embodiments, as described in more detail below, the transportation matching system can set the requirements for a destination location to be a trending destination location based on a variety of different criteria (e.g., count, category, time of day/week/month/season).

As used herein, the term "current reference time" refers to a time from which a threshold time period for determining trending destination locations is determined. For example, a current reference time can include a time at which a requester device sends a request to a transportation matching system to obtain trending destination locations or receives trending destination location data from the transportation matching system (e.g., in a push notification). A current reference time can thus include a time at which a requester device displays an option to display trending destination locations. As an alternative example, a current reference time can include (i) a time at which a requester device identifies a user input interacting with an option to display trending destination locations or (ii) or a time selected by a requester for a transportation request in the future.

As used herein, the term "classification model" refers to a computer model that classifies destination locations as trending destination locations. In some embodiments, for example, a classification model can include a computer model that can be tuned (e.g., trained) based on inputs to approximate unknown functions. For example, a classification model can utilize algorithms to learn from, and make predictions on, known data by analyzing the known data to learn to generate outputs that reflect patterns and attributes of the known data. A classification model can include, but is not limited to, a singular value decomposition model, a K-nearest-neighbors model, decision trees, support vector machines, linear regression, logistic regression, Bayesian networks, random forest learning, dimensionality reduction algorithms, boosting algorithms, artificial neural networks (e.g., convolutional neural networks or recurrent neural networks), deep learning, etc.

Turning now to the figures, FIG. 1 illustrates a schematic diagram of a system environment 100 for implementing a transportation matching system 102 in accordance with one or more embodiments. This disclosure provides an overview of the transportation matching system 102 with reference to FIG. 1. As shown, FIG. 1 illustrates a transportation matching system 102 implemented on one or more server(s) 104. The system environment 100 further includes requester devices 106a-106n. Furthermore, as illustrated, the system environment 100 includes provider devices 108a-108n associated with provider vehicles 110a-110n. In one or more embodiments, the provider vehicles 110a-110n can be further associated with providers 112a-112n, which can be human providers. In one or more alternative embodiments, the provider vehicles 110a-110n can be autonomous vehicles that are not associated with human providers.

Additionally, the server(s) 104, the requester devices 106a-106n, and the provider devices 108a-108n can be in communication via a network 114. For example, the transportation matching system 102 communicates with the requester devices 106a-106n and the provider devices 108a-108n via the network 114 to determine locations of the requester devices 106a-106n and the provider devices 108a-108n, respectively. Per device settings, for instance, the transportation matching system 102 may receive location coordinates from the requester devices 106a-106n and the provider devices 108a-108n, respectively. Based on the location coordinates, the transportation matching system 102 matches or assigns one or more of the provider devices 108a-108n (and corresponding provider vehicle(s) 110a-110n) with one or more of the requester devices 106a-106n for transportation.

As further indicated by FIG. 1, the requester devices 106a-106n include requester applications 116a-116n, and the provider devices 108a-108n include provider applications 118a-118n. In some embodiments, the requester applications 116a-116n (or the provider applications 118a-118n) include web browsers, applets, or other software applications (e.g., native applications) respectively available to the requester devices 106a-106n (or the provider devices 108a-108n). Additionally, in some instances, the transportation matching system 102 provides data including instructions that, when executed by the requester devices 106a-106n or by the provider devices 108a-108n, respectively create or otherwise integrate one of the requester applications 116a-116n or the provider applications 118a-118n with an application or webpage.

The network 114 shown in FIG. 1 may include one or more networks and may use one or more communication platforms or technologies suitable for transmitting data and/or communication signals. In some embodiments, the network 114 includes a cellular network. The network 114 can additionally include the Internet or World Wide Web. Additionally or alternatively, the network 114 can include various other types of networks that use various communication technologies and protocols, such as a corporate intranet, a virtual private network ("VPN"), a local area network ("LAN"), a wireless local network ("WLAN"), a wide area network ("WAN"), a metropolitan area network ("MAN"), or a combination of two or more such networks.

As further indicated by FIG. 1, a requester may use a requester device executing a requester application to request transportation services, receive a price estimate for the transportation service, edit a transportation request, or access other transportation-related services. For example, in some cases, a requester may interact with a requester device (e.g., requester device 106a) through graphical user interfaces of a requester application (e.g., requester application 116a) to view trending destination location data provided to the requester device by the transportation matching system 102, as explained in more detail below. Additionally, the requester can interact with the requester device to make a request for transportation using the graphical user interfaces of the requester application.

As mentioned, the transportation matching system 102 can provide trending destination location data to requester devices. In one or more embodiments, the transportation matching system 102 determines trending destination locations based on data received from the requester devices 106a-106n and/or from the provider devices 108a-108n. Additionally, the transportation matching system 102 can determine the trending destination locations based on information received from additional sources, such as from merchant systems, mapping systems, or the like.

In one example, the transportation matching system 102 can use the information received from a requester device, one or more provider devices, and/or other sources to determine a set of trending destination locations for a requester associated with the requester device. The transportation matching system 102 can further rank destination locations within a geographic region corresponding to the requester device (or to a location indicated by the requester device) to determine the set of trending destination locations. For instance, the transportation matching system 102 can include a classification model that uses the received information as input and then outputs a set of trending destination locations or a ranked list of destination locations from which the transportation matching system determines the trending destination locations. The transportation matching system 102 can then provide the set of trending destination locations to the requester device for displaying along with one or more interactive options in connection with the trending destination locations.

Additionally, as shown in FIG. 1, a provider can use a provider application to accept a transportation request for transportation services. In particular, a provider can interact with a provider device (e.g., provider device 108a) through graphical user interfaces of a provider application (e.g., provider application 118a) to view details associated with a transportation request. For example, in response to a requester device submitting a request for transportation services to the transportation matching system 102, the transportation matching system 102 can send the transportation request to the provider device. The provider can then view and accept (or reject) the transportation request via the provider application. The provider device can also display information to assist the provider in fulfilling the transportation request (e.g., a map interface with directions, estimated time).

When a provider vehicle is an autonomous vehicle or a hybrid self-driving vehicle, the provider vehicle may include additional components not depicted in FIG. 1. Such components may include location components, one or more sensors by which the autonomous vehicle navigates, and/or other components necessary to navigate without a provider (or with minimal interactions with a provider). Regardless of whether a provider vehicle is associated with a provider, a provider vehicle optionally includes a locator device, such as a GPS device, that determines the location of the provider vehicle within the provider vehicles $110a$-$110n$. Furthermore, autonomous vehicles can communicate with the transportation matching system 102 to provide information and to receive information and/or instructions for performing transportation services.

Figure 2:
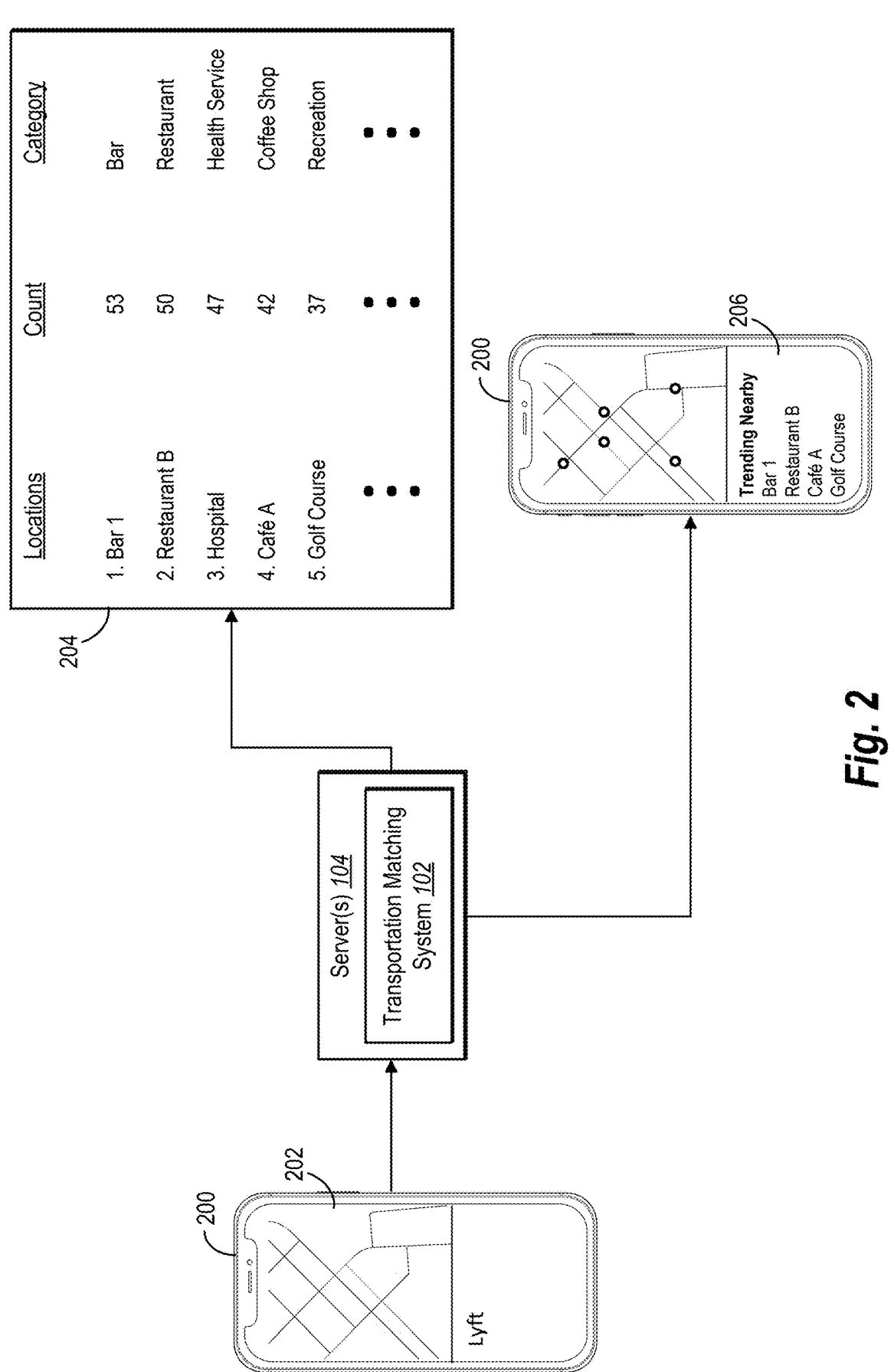
FIG. 2 illustrates an overview of the transportation matching system determining and providing trending destination locations for a requester in accordance with one or more embodiments.

As briefly described above, the transportation matching system 102 can determine trending destination locations that are relevant to a requester to provide to the requester's device. FIG. 2 illustrates an overview of a process for providing trending destination locations to a requester device. In particular, FIG. 2 illustrates the transportation matching system 102 of FIG. 1 using information associated with a requester to rank destination locations and generate a set of trending destination locations based on the ranked locations.

For example, FIG. 2 illustrates a requester device 200 that includes a requester application to facilitate requesting transportation for a requester. Specifically, the requester application can include a graphical user interface 202 that provides a digital map to facilitate functions associated with requesting transportation services via the transportation matching system 102. As mentioned above, the requester application can facilitate the display of trending destination location data for the requester.

In one or more embodiments, the requester device 200 provides data to the transportation matching system 102 at the server(s) 104 in connection with receiving trending destination location from the transportation matching system 102. For example, the requester device 200 can send a location to the transportation matching system 102, such as a current location of the requester device 200 (e.g., via a GPS device) or a selected location (e.g., based on an interaction with the requester application by the requester). The requester device 200 can also send other data to the transportation matching system 102 that may be useful in determining trending destination locations for the requester. For example, the requester device 200 can further identify a requester account with corresponding preferences associated with the requester or a transportation history of destination locations of the requester. In some embodiments, the requester device 200 can provide the location data and/or other information to the transportation matching system 102 at the same time or at different times. Additionally, the requester device 200 can provide the location data and/or other information prior to, or in conjunction with, a request to provide trending destination locations to the requester (e.g., a request based on the requester accessing a map or other interface within the requester application).

In response to receiving a request for trending destination locations from the requester device 200, the transportation matching system 102 can determine trending destination locations that are relevant to the requester. For example, FIG. 2 illustrates the transportation matching system 102 generating a ranked list 204 of destination locations within a geographic region of the location received from the requester device 200. In one or more embodiments, the transportation matching system 102 can first identify a geographic region for determining trending destination locations based on a distance from a location received from the requester device 200.

Additionally, the transportation matching system 102 can identify destination locations based on real-time (or near-real-time) transportation request data from a plurality of requester devices and/or provider devices. Specifically, the transportation matching system 102 can identify a number of destination locations within the geographic region. For example, the transportation matching system can identify destination locations from transportation requests based on address or other identifying information corresponding to the destination locations (e.g., business name) within the geographic region. Thus, in some cases, the transportation matching system 102 may only identify locations for ranking if the locations are associated with a transportation request and within a designated geographic region.

Once the transportation matching system 102 has identified destination locations within the geographic region, in some cases, the transportation matching system 102 ranks the destination locations. For example, the transportation matching system 102 can determine a count of each transportation request and/or each completed transportation within the geographic region. The transportation matching system 102 can rank the destination locations at least based on the count of each transportation request to each destination location and/or completed transportations to each destination location. According to some embodiments, the transportation matching system 102 can assign a score to each destination location and then determine the rankings according to the scores. In one or more embodiments, the transportation matching system 102 can determine the rankings using a computer model (e.g., machine-learning) or filter locations according to count rankings.

In one or more embodiments, the transportation matching system 102 determines a set of trending destination locations based on the rankings of destination locations. In particular, the transportation matching system 102 can select a threshold number of trending destination locations based on their respective rankings. To illustrate, the transportation matching system 102 can determine that the top N ranked destination locations within the geographic region are trending destination locations. Alternatively, the transportation matching system 102 can also select destination locations that meet a threshold count or score as trending destination locations. Accordingly, the transportation matching system 102 may determine a set number of trending destination locations or a variable number of trending destination locations according to the particular implementation.

The transportation matching system 102 can also utilize other information associated with each destination location to determine trending destination locations. For example, the transportation matching system 102 can assign a category to each destination location. As shown in FIG. 2, for instance, the ranked list 204 includes a designated category for each destination location sorted by count. The transportation matching system 102 can use the categories of the destination locations to determine whether to include each destination location in (or exclude a destination location from) a set of trending destination locations 206. For instance, the transportation matching system 102 can determine to exclude destination locations that correspond to certain location categories (e.g., hospitals, private residences). Furthermore, the transportation matching system 102 can use manually curated destinations, for example, to remove destination locations indicated for removal by an administrator or a crowd-sourced group. In some embodiments, the transportation matching system 102 also applies weights to each of the categories to apply a higher or lower ranking to a destination location based on the respective location category.

As indication above, in some embodiments, the transportation matching system 102 utilizes information associated with the requester to determine trending destination locations. Specifically, the transportation matching system 102 may determine different trending destination locations for different requesters within the same geographic region based on determining that different destination locations may be relevant to some requesters but not to others. For example, the transportation matching system 102 can identify destination locations that may be of interest to a requester based on the requester's transportation history, preferences, or other information indicating the requester's interests. For example, the transportation matching system 102 may identify a category based on the requester's transportation history to destination locations and identify trending destination locations within the category for display on the requester device 200.

As further illustrated in FIG. 2, after generating the ranked list 204 of destination locations and determining trending destination locations, the transportation matching system 102 provides the set of trending destination locations 206 to the requester device 200. FIG. 2 illustrates the requester device 200 displaying the set of trending destination locations 206 within a graphical user interface of the requester application. Also as shown, the set of trending destination locations 206 may include destination locations that correspond to certain categories while excluding others. For instance, FIG. 2 illustrates that the set of trending destination locations 206 excludes the "Hospital" location due to the location category, even though the "Hospital" location was ranked third in the ranked list 204. Thus, the transportation matching system 102 can provide the most relevant trending destination locations to the requester device 200. The requester can then interact with the trending destination locations via the requester device 200, as described in more detail below.

Figure 3:
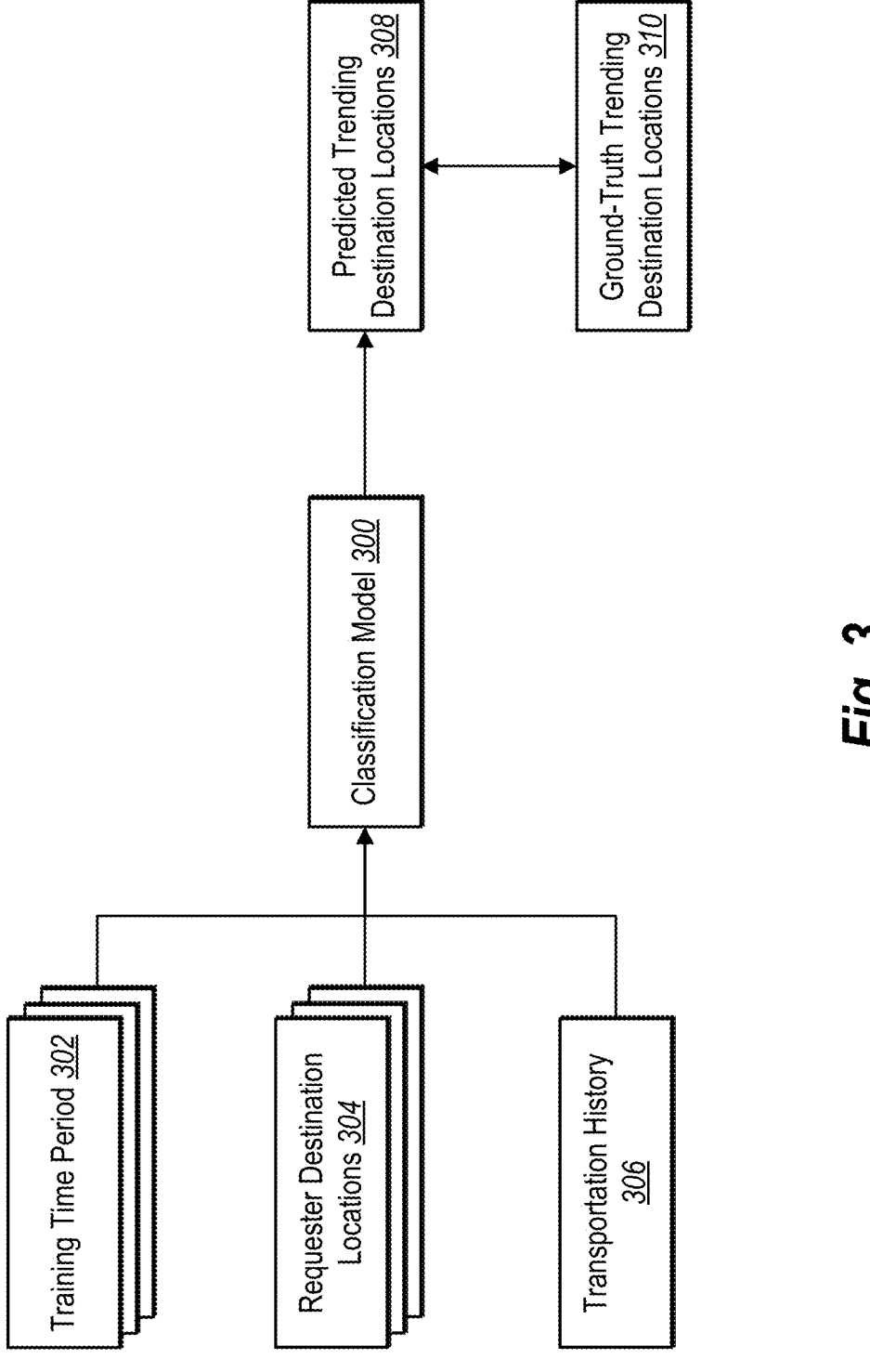
FIG. 3 illustrates the transportation matching system training a classification model to predict trending destination locations for a requester in accordance with one or more embodiments.

As previously described, the transportation matching system 102 can utilize a classification model to determine trending destination locations for users. In one or more embodiments, the transportation matching system 102 can first train a classification model by learning parameters of the classification model using a training dataset. FIG. 3 illustrates an embodiment of the transportation matching system 102 training a classification model 300 to output trending destination locations for a requester or for a group of requesters (e.g., a segment of users). Specifically, the transportation matching system 102 can use data associated with the requester and/or data associated with one or more other requesters to learn parameters of the classification model. As previously noted, the classification model 300 can include a K-nearest-neighbors model, a singular value decomposition model, a convolutional neural network ("CNN"), or other neural network.

In one or more embodiments, FIG. 3 illustrates that the transportation matching system 102 can train the classification model using training time periods 302, requester destination locations 304, and a transportation history 306. In particular, the training time periods 302 can include a number of different time periods for which the transportation matching system 102 trains the classification model 300 to output trending destination locations. More specifically, the types of destination locations that requesters visit can change based on the time of day, week, or month, whether the time period falls on a specific holiday, or during different seasonal time periods. By learning parameters of the classification model 300 based on a number of different time periods, the classification model 300 can more accurately determine trending destination locations regardless of the reference time.

Additionally, the transportation matching system 102 can learn parameters of the classification model 300 based on requester destination locations 304 within one or more geographic regions. For example, in one or more embodiments, the transportation matching system 102 can use previously identified destination locations within one or more geographic regions as the requester destination locations 304 for training the classification model 300. The requester destination locations 304 can include destination locations of completed transportations. In one or more embodiments, the requester destination locations 304 can additionally, or alternatively, include destination locations of submitted transportation requests.

Furthermore, the transportation matching system 102 can train the classification model 300 based on specific user segments. For example, the transportation matching system 102 can determine a user segment to which a requester belongs based on characteristics of the requester. The transportation matching system 102 can then identify the requester destination locations 304 according to the determined user segment. By learning parameters based on a specific user segment, the transportation matching system 102 can ensure that the classification model 300 outputs trending destination locations for the specific user segment.

Furthermore, FIG. 3 illustrates that the transportation matching system 102 can learn parameters of the classification model 300 based on a transportation history 306. For instance, the transportation matching system 102 can train a separate model for each requester. In one or more embodiments, the transportation history 306 includes a transportation history associated with a target requester. Thus, the transportation matching system 102 can use the transportation history 306 of the target requester to train the classification model 300. The transportation history 306 of the requester can include previous destination locations that the requester has traveled. The previous destinations of the requester may be within the geographic region or within any geographic regions.

To train the classification model 300, in some embodiments, the transportation matching system 102 provides the training data (e.g., the training time periods 302, the requester destination locations 304, and the transportation history 306) as input to the classification model 300. FIG. 3 illustrates the classification model 300 processing the input and generates predicted trending destination locations 308 based on the input. Specifically, the classification model 300 can generate the predicted trending destination locations 308 for the one or more geographic regions based on the one or more geographic regions associated with the requester destination locations 304. In some embodiments, the transportation matching system 102 can train the classification model 300 in an iterative process for the various training data inputs. For instance, in some embodiments, the transportation matching system 102 performs a first training iteration based on a first training time period from among the training time periods 302, a first set of requester destination locations within the requester destination locations 304, and the transportation history 306; and performs a second training iteration based on a second training time period from among the training time periods 302, a second set of requester destination locations from the requester destination locations 304, and the transportation history 306. In some embodiments, the classification model 300 generates a confidence score for a list of trending destination locations or a confidence score for each trending destination location from a list of trending destination locations.

Once the classification model 300 has generated the predicted trending destination locations 308, the transportation matching system 102 can compare the predicted trending destination locations 308 to ground-truth trending destination locations 310. In particular, the ground-truth trending destination locations 310 can include a set of destination locations that the transportation matching system 102 has determined are trending destination locations. For example, the transportation matching system 102 can use a curated list of destination locations (e.g., manually curated, or curated by a machine-learning model) as the ground-truth trending destination locations 310. Additionally, the ground-truth trending destination locations 310 can include destination locations from specific categories (e.g., including one or more location categories and excluding one or more location categories for a region and/or a segment of users).

In response to comparing the predicted trending destination locations 308 to the ground-truth trending destination locations 310, the transportation matching system 102 can determine a loss based on a loss function. Specifically, the loss function (e.g., a softmax loss function, a cross-entropy loss function, or a mean-squared-error loss function) can quantify the difference between the predicted trending destination locations 308 and the ground-truth trending destination locations 310. The transportation matching system 102 may determine the loss function based on the type of classification model. The transportation matching system 102 can then use the loss function to adjust parameters of the classification model 300 so that the classification model 300 outputs predicted trending destination locations 308 closer to the ground-truth trending destination locations 310.

In one or more embodiments, the transportation matching system 102 can use an iterative training process to learn parameters of the classification model 300. For instance, in a given training iteration, the transportation matching system 102 can learn parameters of the classification model based on the loss function, as described above. In subsequent training iterations, the transportation matching system 102 can continue the process of determining a loss and updating the parameters of the classification model 300 until the model results converge with the ground-truth results. The transportation matching system 102 can also use a dataset to verify the classification model 300 after updating parameters of the classification model 300.

In one or more embodiments, the transportation matching system 102 can train the classification model 300 in a plurality of training steps. For example, the transportation matching system 102 can train the classification model 300 first on a set of data generally applicable to a plurality of requesters. To illustrate, the transportation matching system 102 can train the classification model 300 generally based on a plurality of destination locations associated with a plurality of transportation requests. The transportation matching system 102 can then fine-tune parameters of the classification model 300 using the transportation histories of the target requester(s). For example, the transportation matching system 102 can train the classification model 300 for a first requester based on a transportation history of the first requester. The transportation matching system 102 can also train the classification model 300 for a second requester (or group of requesters) based on a transportation history of the second requester (or transportation histories of the group of requesters). More specifically, the transportation matching system 102 can train the classification model 300 based on general destination location data, and then further train the classification model 300 based on specific destination location data corresponding to the specific requester. The transportation matching system 102 can thus train a separate classification model for each of a plurality of individual requesters.

In some embodiments, the transportation matching system 102 further customizes the classification model 300 by geographic region. For example, the transportation matching system 102 can train the classification model 300 based on destination locations of requesters within a particular geographic region. By training the classification model 300 based on the specific geographic region, the transportation matching system 102 can take into account the particular preferences of requesters within the geographic region, the types of destination locations within the geographic region, or other details about the geographic regions that may distinguish it from other geographic regions. Additionally, the transportation matching system 102 can train the classification model 300 based on a plurality of geographic regions that may have similar characteristics.

Figure 4:
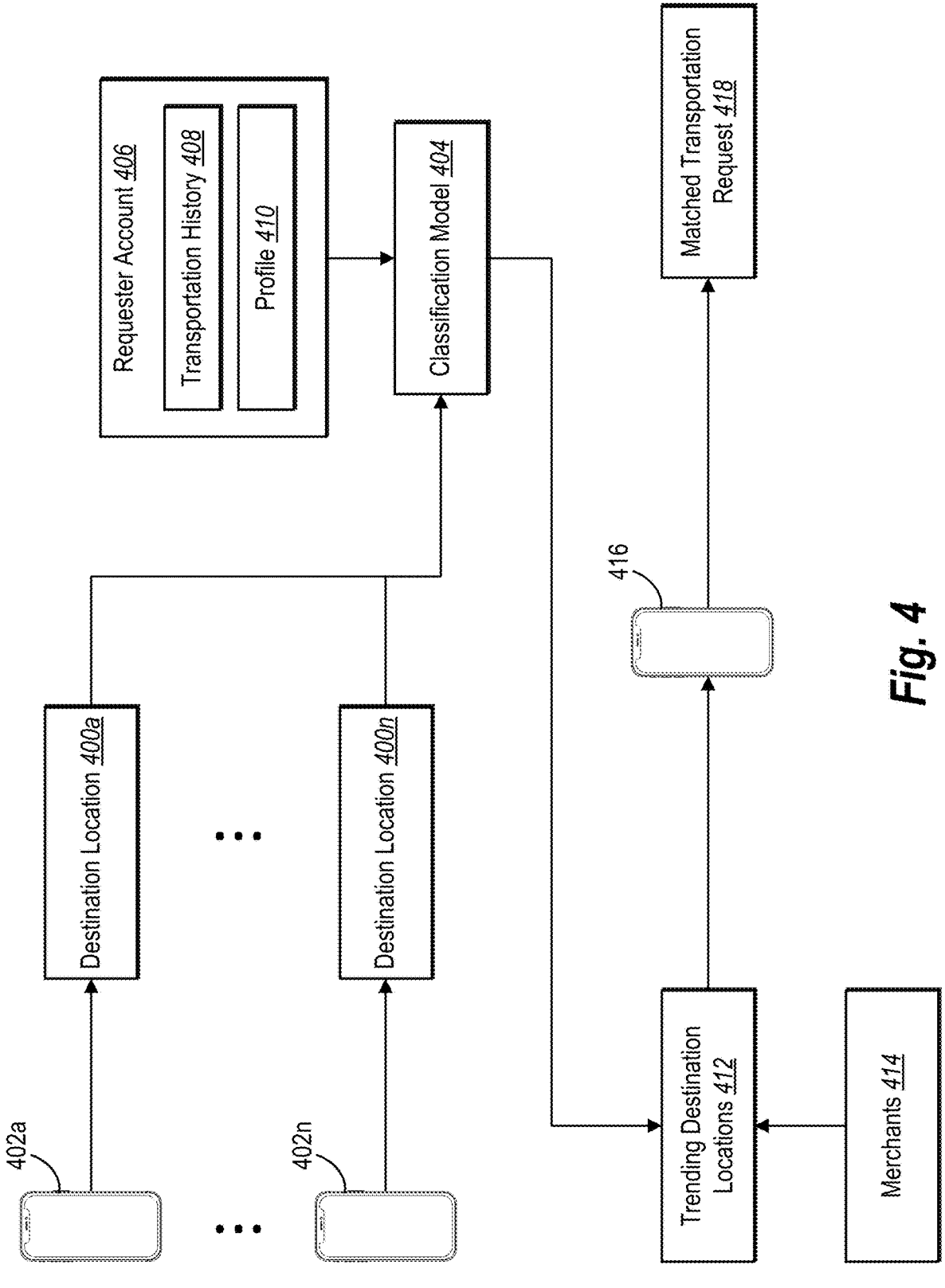
FIG. 4 illustrates the transportation matching system determining and providing trending destination locations for a requester using a classification model and matching a transportation request with a provider in accordance with one or more embodiments.

After training a classification model to predict trending destination locations, the transportation matching system 102 can utilize the classification model to determine trending destination locations for a requester. FIG. 4 illustrates a process diagram of the transportation matching system 102 determining trending destination locations for a requester and processing a transportation request by the requester. Specifically, FIG. 4 illustrates the transportation matching system 102 using destination location data from requesters within a geographic location in connection with information about the requester to determine the trending destination locations.

For example, FIG. 4 illustrates the transportation matching system 102 identifying destination location data including a plurality of destination locations 400a-400n. The transportation matching system 102 can identify the destination locations 400a-400n from transportation requests associated with a plurality of requester devices 402a-402n within a particular geographic region of a target requester. For instance, the transportation matching system 102 can identify the destination locations 400a-400n based on completed transportation requests (e.g., requests for which a provider vehicle transported a requester to a destination location). Alternatively, the transportation matching system 102 can use destination locations based on any transportation request made to locations within the geographic region (e.g., transportation requests received from the requester devices 402a-402n including completed requests and in-progress requests).

Additionally, the transportation matching system 102 can identify the destination locations 400a-400n based on a current reference time. In particular, the transportation matching system 102 can identify destination locations 400a-400n associated with transportation requests that have occurred within a threshold time period of the current reference time. As an example, the transportation matching system 102 can identify destination locations of requests that the transportation matching system 102 received within the last hour or two hours of a requester device opening a requester application, though the threshold time period may be any amount of time. The transportation matching system 102 can thus update the trending destination locations as the destination locations identified for requests change over time.

Additionally, the transportation matching system 102 can use information regarding trending destination locations from similar time periods, even if a particular destination location is not currently trending. For example, the transportation matching system 102 may include one or more destination locations that were trending during a previous day during the same time period or during a future time period when the requester intends to travel. To illustrate, in some embodiments, the transportation matching system 102 can identify and include one or more destination locations that were trending during a previous lunch time period (e.g., 11:30 am-1:30 pm) in trending destination locations for the next day during the same time period.

As indicated above, in some embodiments, the transportation matching system 102 provides the destination locations 400a-400n to a classification model 404. The classification model 404 may comprise any of the models described above, including, but not limited to, a k-nearest-neighbors model, a singular value decomposition model, a CNN, or other neural network. In addition to identifying the destination locations 400a-400n, the transportation matching system 102 can obtain information about the requester to which the transportation matching system 102 is providing trending destination locations. Specifically, the transportation matching system 102 can access a requester account 406 associated with the target requester. The transportation matching system 102 can provide one or more components of the requester account 406 to the classification model 404.

For example, the requester account 406 can include a transportation history 408 associated with the requester. For instance, the transportation history 408 can include a history of transportation requests that the requester has made via the transportation matching system 102. The transportation history 408 can include details about each transportation request, including a pick-up location, a destination location, and a date and time of each request. The transportation history 408 can also include details about the particular geographic region in which each destination location is located.

The requester account 406 can also include profile 410 associated with the requester. For example, the profile 410 can include explicitly defined preferences of the requester indicating likes or interests of the requester. The profile 410 can also include likes or interests that the transportation matching system 102 has inferred for the requester based on the transportation history 408, including, but not limited to, preferred destination locations, categories for preferred destination locations, or a list of most frequently requested destination locations according to a count of corresponding transportation requests. In some instances, the transportation matching system 102 can provide preferences for locations or other information from the profile 410 as an input to the classification model 404. Alternatively, the transportation matching system 102 can utilize preferences for locations or other information from the profile 410 to further curate an output of the classification model 404.

As indicated above, FIG. 4 illustrates the transportation matching system 102 using the classification model 404 to determine trending destination locations 412 for the requester based on the destination locations 400a-400n and the data from the requester account 406. For example, the transportation matching system 102 can determine and/or rank destination locations based on frequency of transportation requests associated with each destination location. More specifically, the trending destination locations can include destination locations that a threshold number of requesters are requesting (or to which they are transported to) within a threshold amount of time of a current reference time (within the analyzed time window). To illustrate, the transportation matching system 102 can determine that the trending destination locations 412 include destination locations corresponding to at least two transportation requests per minute, at least twenty transportation requests within the last hour, or another threshold count of transportation requests within a time period. The transportation matching system 102 can set such requirements based on the specific time period, location category, and geographic region.

As suggested above, the transportation matching system 102 can also determine the trending destination locations 412 based on destination locations in which the requester is likely to be interested. By analyzing the transportation history 408 and/or the profile 410 of the requester, for example, the transportation matching system 102 can determine that the requester is most likely to be interested in particular location categories or specific destination locations within a location category. The transportation matching system 102 can thus customize the trending destination locations 412 to each requester to provide the most relevant information to each requester.

For example, the transportation matching system 102 can determine that the profile 410 include certain locations (e.g., saved locations such as "home" or "work" locations) or certain types of location categories (e.g., one or more locations of a specific category), and thereby exclude the locations or types of location categories from the trending destination locations. The transportation matching system 102 can further filter the trending destination locations 412 based on data from a requester device. To illustrate, in response to a request to filter trending destination locations, the transportation matching system 102 can return trending destination locations that meet the filter requirements.

In one or more embodiments, the transportation matching system 102 can also include additional destination locations within (or in conjunction with) the trending destination locations 412. For example, as described in more detail below, the transportation matching system 102 can provide an application program interface ("API") or other integration interface that allows merchants 414 to integrate with the transportation matching system 102. The merchants 414 can then provide sponsored destination locations to the transportation matching system 102 to be included with the trending destination locations 412. To illustrate, a merchant can sponsor a destination location (e.g., by paying a sponsorship/transaction fee to the transportation matching system 102), and the transportation matching system 102 can include the sponsored destination location in addition to (or as one of) the trending destination locations 412. In at least some embodiments, the transportation matching system 102 can also analyze sponsored merchant locations (e.g., using a classification model or other machine-learning) to determine which sponsored merchant locations to provide to a given requester.

After determining the trending destination locations 412, the transportation matching system 102 can provide the trending destination locations 412 to a requester device 416 associated with the target requester. In particular, the transportation matching system 102 can provide the trending destination locations 412 for display within a requester application associated with the transportation matching system 102. A requester can then interact with the requester device 416 to view and/or interact with the trending destination locations 412. For example, the requester can interact with the trending destination locations 412 via the requester device 416 to select one of the trending destination locations 412 as a destination location for a transportation request.

For instance, FIG. 4 illustrates the transportation matching system 102 generating a matched transportation request 418 by matching the transportation request with a provider device or a provider vehicle to fulfill the transportation request for the selected destination location. For example, the transportation matching system 102 can receive a request to transport the requester to a trending destination location. Alternatively, the transportation matching system 102 can receive a request to transport the requester to a sponsored location. In either case, the transportation matching system 102 can match the request with a provider vehicle (and, in some cases, a provider device) to transport the requester from a pickup location to the selected trending destination location or sponsored location.

Figure 5B:
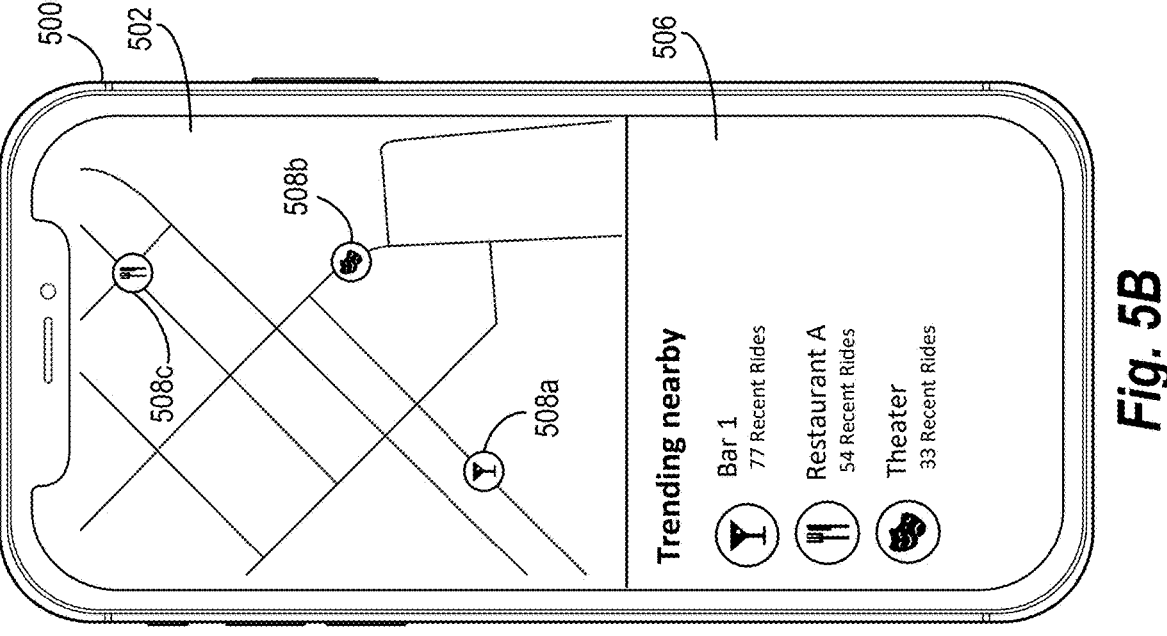
FIGS. 5A-5C illustrate a requester device presenting graphical user interfaces for displaying trending destination locations within a geographic region in accordance with one or more embodiments.
Figure 5A:
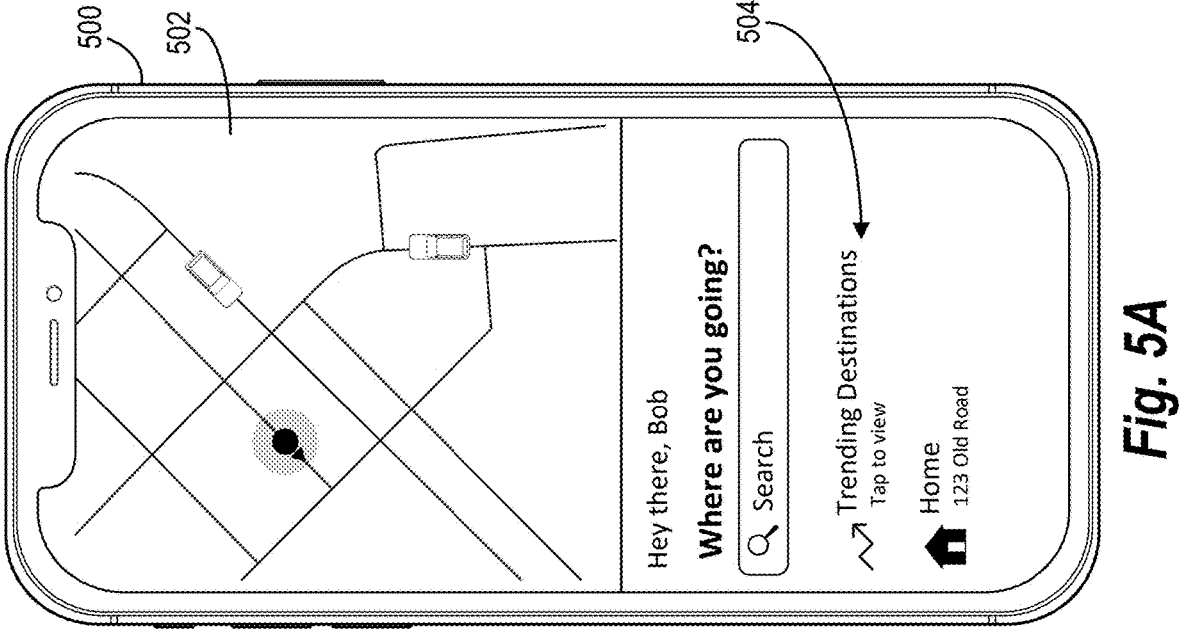
Figure 5C:
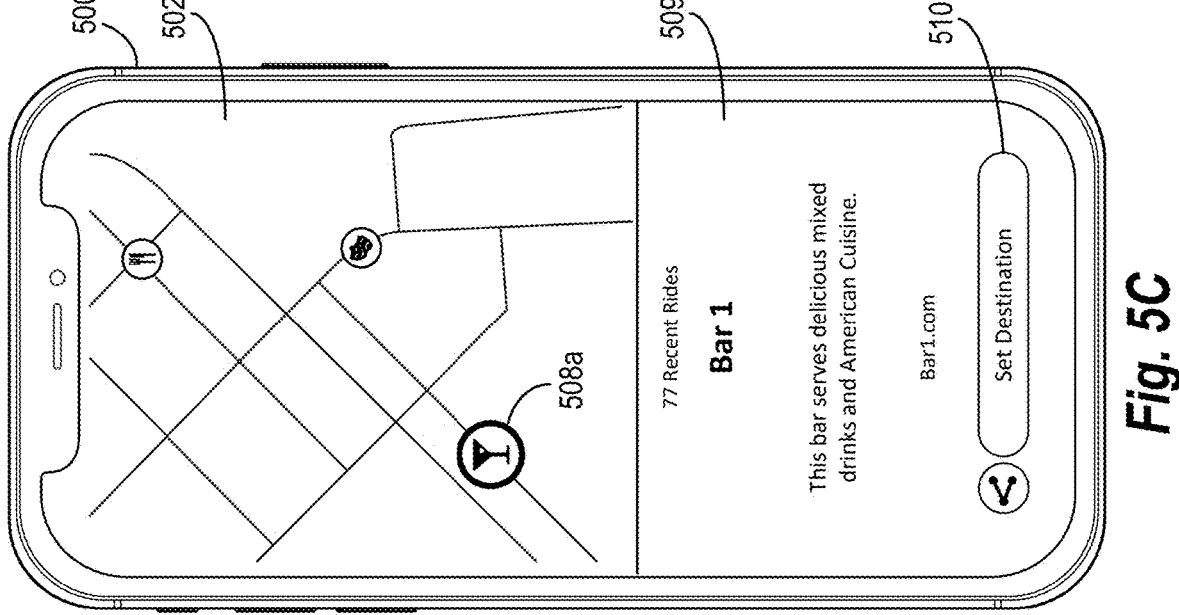

FIGS. 5A-5C illustrate the transportation matching system 102 communicating with a requester device 500 to provide trending destination location data to the requester device 500. For example, FIGS. 5A-5C illustrate the transportation matching system 102 providing trending destination locations for display within a graphical user interface in a requester application 502 on the requester device 500. Specifically, FIGS. 5A-5C illustrate various graphical user interfaces for displaying data associated with displaying trending destination locations and options for interacting within such trending destination locations.

In one or more embodiments, the transportation matching system 102 can provide trending destination locations to the requester device 500 in response to receiving a request from the requester device 500 for the trending destination locations. For instance, the requester device 500 can send a request to the transportation matching system 102 in response to the requester device 500 opening a map interface within the requester application 502 or upon opening the requester application 502. Alternatively, the requester device 500 can send a request to the transportation matching system 102 when providing location data to the transportation matching system 102. In other examples, the requester device 500 can send requests to the transportation matching system 102 periodically to maintain an updated list of trending destinations.

For example, FIG. 5A illustrates the transportation matching system 102 providing, for display within the graphical user interfaces of the requester application 502 of the requester device 500, a selectable trend option 504 to display the trending destination locations. In particular, the requester device 500 can display the selectable trend option 504 within a map interface or other interface with an indication of trending destination locations that are available to view and/or available transportation provider vehicles in connection with a transportation request. Accordingly, in response to an interaction with the selectable trend option 504 (e.g., a selection of the selectable trend option 504 via a touch-screen or other input method), the requester device 500 can display the trending destinations provided to the requester device 500 from the transportation matching system 102.

Upon detecting a selection of the selectable trend option 504 or detecting a selection to open the requester application 502, the requester device 500 can present corresponding trending destination locations. For instance, FIG. 5B illustrates the requester device 500 displaying a set of trending destination locations 506 within a graphical user interface of the requester application 502. In one or more embodiments, the requester device 500 can display the set of trending destination locations 506 within a map interface or other interface in response to a user input to select the selectable trend option 504. For example, as shown in FIGS. 5A-5B, the requester device 500 displays the selectable trend option 504 (in FIG. 5A) and the set of trending destination locations 506 (in FIG. 5B) within an overlay on top of a map interface. The requester device 500 may alternatively display the set of trending destination locations 506 within another graphical user interface of the requester application 502.

As indicated above, in one or more embodiments, the transportation matching system 102 may provide the set of trending destination locations 506 in an interactive interface. Specifically, the set of trending destination locations 506 may include an interactive list of trending destination locations within the geographic region of the location of the requester device 500. The requester device 500 may respond to inputs within the graphical user interface of the requester application 502 to scroll through the list or select individual trending destination locations within the list, sort the trending destination locations by popularity, location category, proximity to the requester, or other functions to modify how trending destination locations are displayed.

The requester device 500 may also display additional information associated with the set of trending destination locations 506. For instance, the requester device 500 may display map icons 508a-508c associated with the trending destination locations within a map interface. The positions of the map icons 508a-508c may correspond to the locations (e.g., addresses) of the corresponding trending destination locations within the map interface. Additionally, the map icons 508a-508c may include graphical elements that indicate a location category of each corresponding trending destination location. To illustrate, the map icons 508a-508c may indicate whether a trending destination location is a bar, a restaurant, a theater, or other category of location. In some embodiments, the requester device 500 displays an option (e.g., a toggle button) that, upon selection, shows the map icons 508a-508c or hides the map icons 508a-508c within the graphical user interface of the requester application 502.

In response to a selection of one of the trending destination locations (e.g., a trending destination location associated with the map icon 508a), the requester device 500 may provide additional information associated with the selected trending destination location. In particular, the transportation matching system 102 may provide details associated with the selected trending destination location that includes information, such as the location name, a location category, an option to share the trending destination location with another person, or a URL or link to a website of the location.

As shown in FIG. 5C, for example, the transportation matching system 102 can provide a digital card 509 including the additional details associated with the selected trending destination location that the requester device 500 displays within a graphical user interface of the requester application 502. As described below, in some embodiments, a merchant can provide details for such a digital card through user input via an API. Additionally, or alternatively, in some embodiments, an administrator can provide details for such a digital card through user input.

In one or more embodiments, the transportation matching system 102 can also provide functionality for setting a trending destination location as a destination location of a transportation request. For example, FIG. 5C illustrates the requester device 500 displaying a selectable destination option 510 associated with the selected trending destination location. In one or more embodiments, as shown, the transportation matching system 102 can provide the selectable destination option 510 within a digital card and/or another type of presentation of details associated with the trending destination location.

Additionally, the transportation matching system 102 can obtain data associated with a trending destination location from a requester after fulfilling a transportation request to the trending destination location. For example, after a provider vehicle transports the requester to a trending destination location, the transportation matching system 102 can send an electronic survey to the requester device 500. The electronic survey can prompt the requester to indicate how busy the trending destination location was. The transportation matching system 102 can use a response from the requester device 500 to update trending destination locations. To illustrate, if the transportation matching system 102 determined that the trending destination location was not very busy, the transportation matching system 102 may modify a ranking of the trending destination location.

Figure 6B:
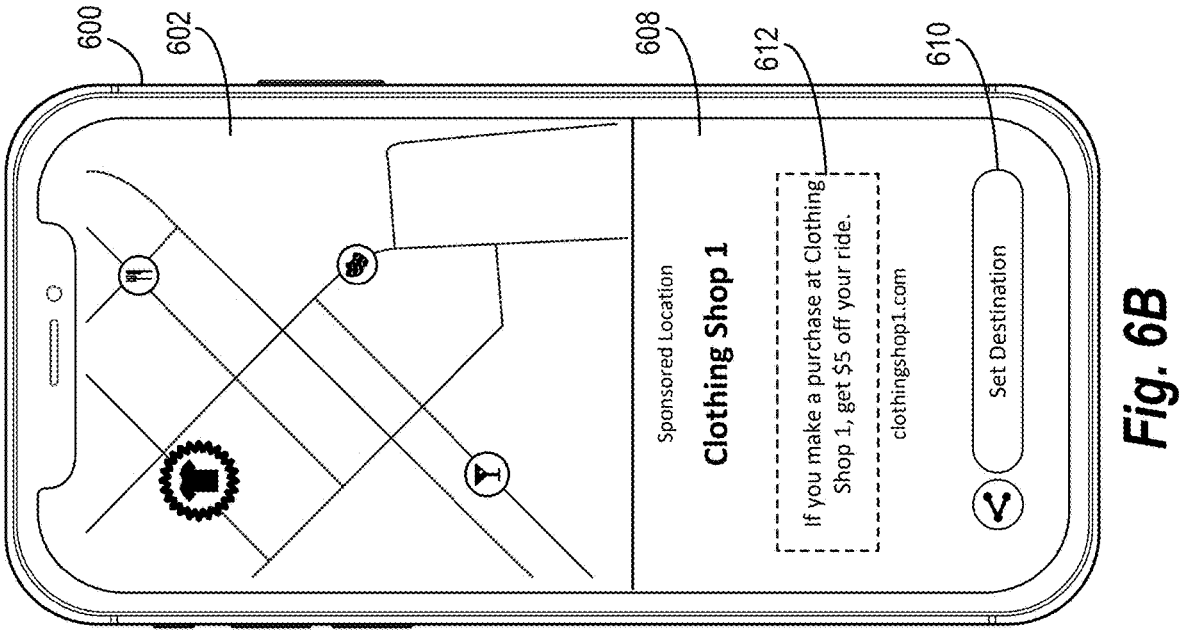
FIGS. 6A-6C illustrate a requester device presenting graphical user interfaces for displaying sponsored merchant locations with trending destination locations in accordance with one or more embodiments.
Figure 6A:
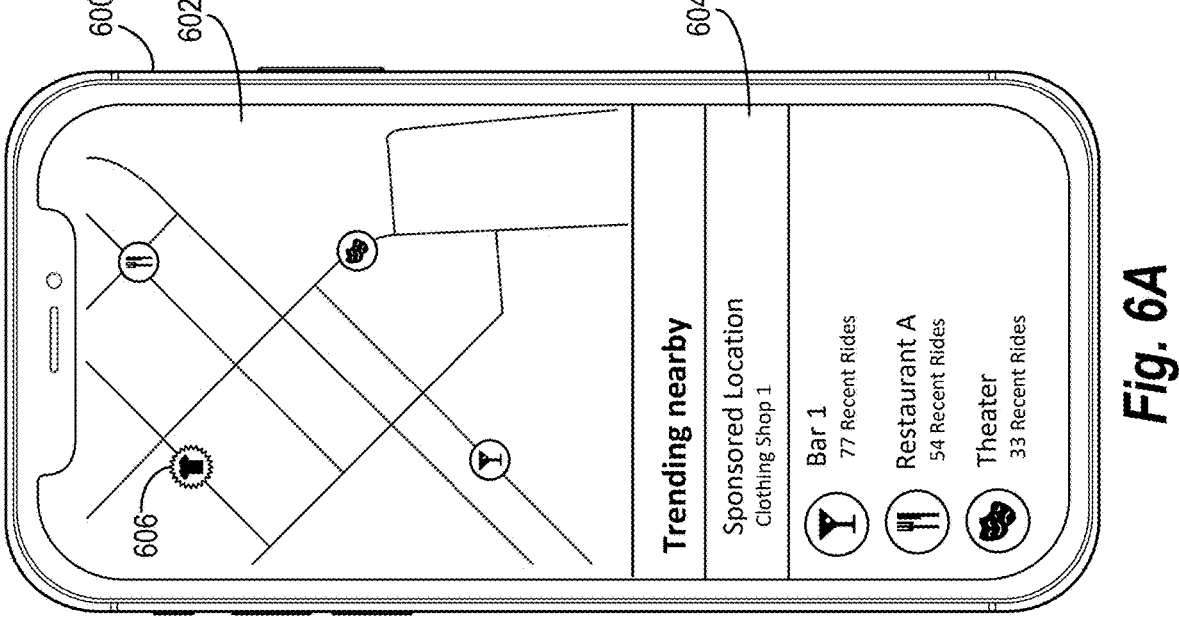
Figure 6C:
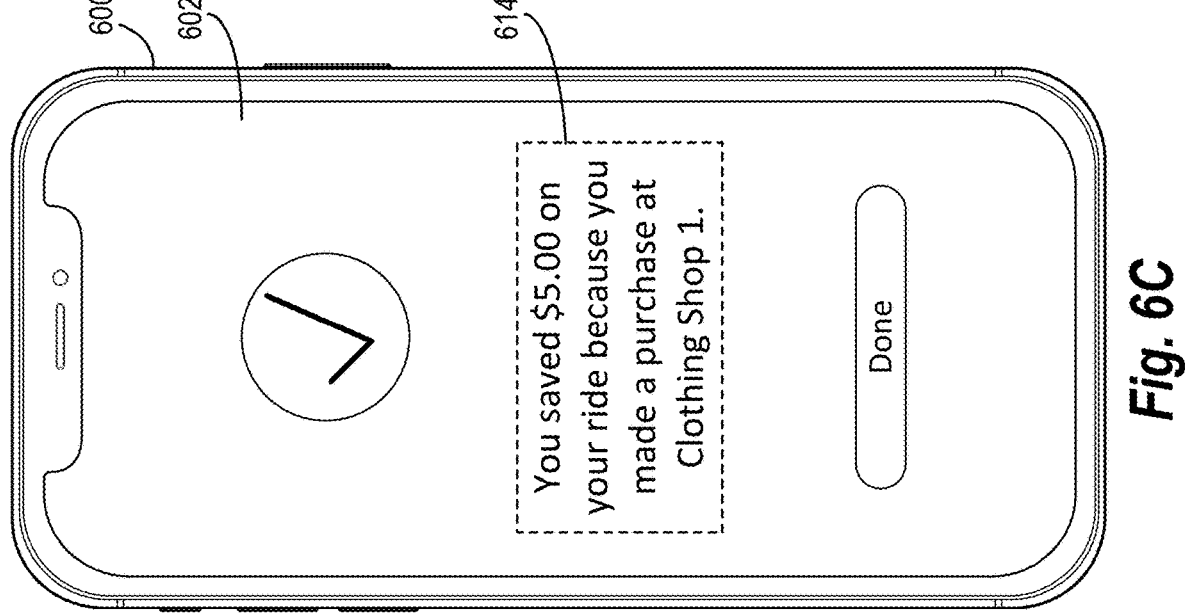

As previously mentioned, in some embodiments, the transportation matching system 102 identifies and surfaces destination locations from specific merchants. FIGS. 6A-6C illustrate the transportation matching system 102 providing information about a sponsored merchant location with trending destination data to a requester device 600 for requesting transportation services to the sponsored merchant location. For example, FIGS. 6A-6C illustrate various graphical user interfaces of a requester application 602 for displaying and providing data associated with a sponsored merchant location and options for interacting based on the sponsored merchant location.

In one or more embodiments, the transportation matching system 102 can provide functionality for merchant systems to sponsor locations (e.g., a computing system controlled or used by a merchant). For example, the merchant systems can sponsor a location associated with the merchant system, such as, but not limited to, a location of a merchant store of the merchant. In one or more embodiments, the merchant system can sponsor a location by integrating with the transportation matching system 102 via an integration interface (e.g., an application program interface ("API")).

As suggested above, in some cases, the merchant system can send information about the sponsored location and/or about the merchant via the API. For instance, the merchant system can send an address of the sponsored location, a location category (e.g., restaurant) of the sponsored location, or an incentive for requesters to select the sponsored location in transportation requests (e.g., a discount to be applied to transportation request). Additionally, the transportation matching system 102 may apply one or more incentives to sponsored locations by default depending on the sponsored location, location category, geographic region, merchant, or requester.

In response to a merchant system sponsoring a location, the transportation matching system 102 can include the sponsored location in addition to (or as part of) a set of trending destination locations. For example, FIG. 6A illustrates the transportation matching system 102 determining that the sponsored location is located within a geographic region corresponding to the set of trending destination locations. In some circumstances, the transportation matching system 102 can provide a sponsored location corresponding to a merchant to the requester device 600. The requester device 600 can then display a sponsored-location indicator 604 of the sponsored location within a list of trending destination locations.

In some embodiments, the transportation matching system 102 can distinguish sponsored locations from other trending destination locations. For example, as illustrated in FIG. 6A, the requester device 600 can display the sponsored-location indicator 604 of the sponsored location visual characteristics (e.g., color, patterns, ordering) that visually distinguishes the sponsored location from trending destination locations. Additionally, the requester device 600 can also present an icon 606 associated with the sponsored location with unique visual characteristics (e.g., color, patterns, border) different from icons associated with trending destination locations within a map interface of the requester application 602. The transportation matching system 102 can thus provide an easy-to-see representation of the merchant location.

In one or more embodiments, the transportation matching system 102 can provide messages in connection with sponsored locations to requesters, including offers or other information about merchants. FIG. 6B illustrates the requester device 600 displaying details associated with a sponsored location within the requester application 602. For instance, the requester device 600 can display a digital card 608 that includes a selectable destination option 610 with the details of the sponsored location. In addition to the selectable destination option 610 and/or other details, the transportation matching system 102 can provide an incentive message 612 indicating that the requester can receive a refund or discount for a transportation request to the sponsored location. To illustrate, the incentive message 612 can include an indication that the requester can receive a discount if the requester makes a purchase (e.g., of a certain amount) at the sponsored location.

If the transportation matching system 102 determines that the requester requests transportation services to the sponsored location, the transportation matching system 102 can apply a refund/discount to the transportation request. In particular, FIG. 6C illustrates the requester device 600 displaying a discount message 614 within a graphical user interface of the requester application 602. Specifically, the transportation matching system 102 can automatically apply the discount to the payment amount of the transportation request and then notify the requester of the applied discount. For example, the discount message 614 can include text indicating that the transportation matching system 102 applied the discount to the payment amount of the transportation request to the sponsored location.

In one or more embodiments, the transportation matching system 102 can determine that the requester made a purchase at the sponsored location (e.g., in a transaction with a corresponding merchant). For example, the transportation matching system 102 can receive an indication directly from a merchant system associated with the merchant that the requester completed a purchase at the sponsored location. Alternatively, the transportation matching system 102 can receive the indication from a third-party system that receives the indication from the merchant system. To illustrate, the transportation matching system 102 can receive data or a message including a requester identifier, a payment amount, and a timestamp associated with a payment transaction at the sponsored location. The transportation matching system 102 can then determine whether the transaction meets one or more thresholds (e.g., a payment amount threshold within a specific time range relative to a time of the transportation request) and apply the discount to the transportation request. The merchant system and/or the transportation matching system 102 may provide some or all of the payment amount for applying the discount amount to the transportation request.

Furthermore, in some embodiments, the transportation matching system 102 provides a discount to the requester for products/services at the sponsored location based on the transportation matching system 102 fulfilling a transportation request to the sponsored location. For example, the transportation matching system 102 can provide data or a message to a requester device indicating that the requester can receive a discount applied to a payment transaction at the sponsored location. In some embodiments, the requester may use the requester device 600 in the payment transaction (e.g., via an electronic payment transaction) to cause the merchant system to apply the discount to the payment transaction. Thus, the merchant system and the transportation matching system 102 can cooperate to increase transportation requests to a particular location via various incentives that the merchant system and/or the transportation matching system 102 can provide to requesters via the requester application 602.

Figure 7B:
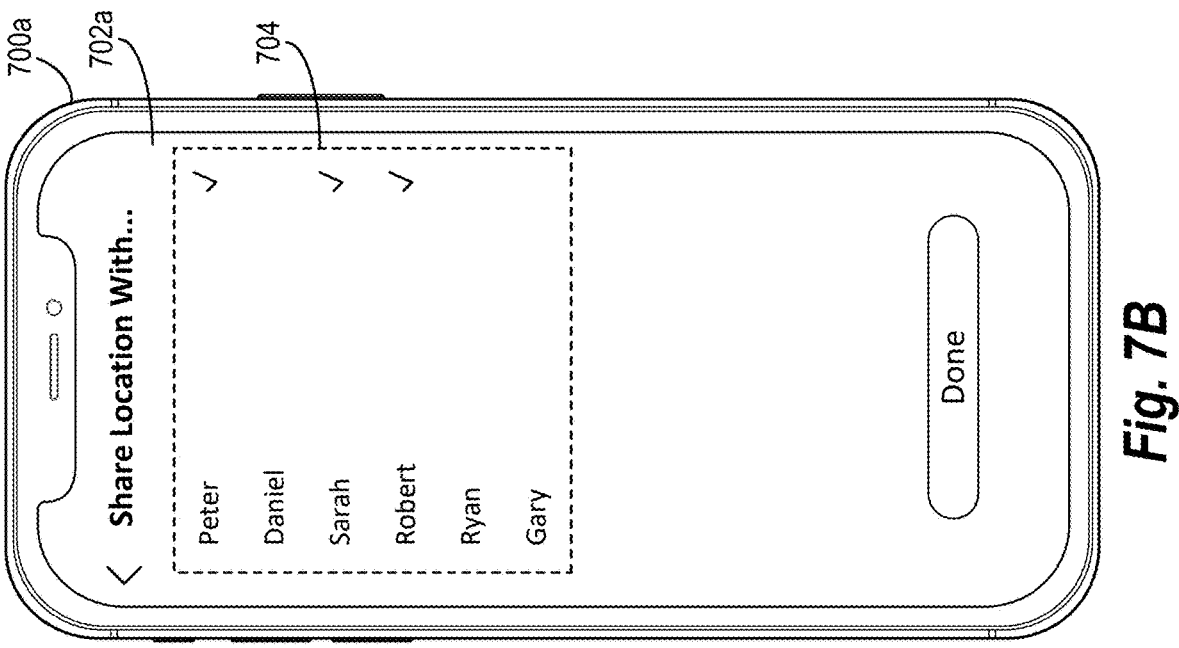
FIGS. 7A-7D illustrate requester devices presenting graphical user interfaces for sharing requester-selected destination locations with other requesters and requesting transportation to the requester-selected destination locations in accordance with one or more embodiments.
Figure 7A:
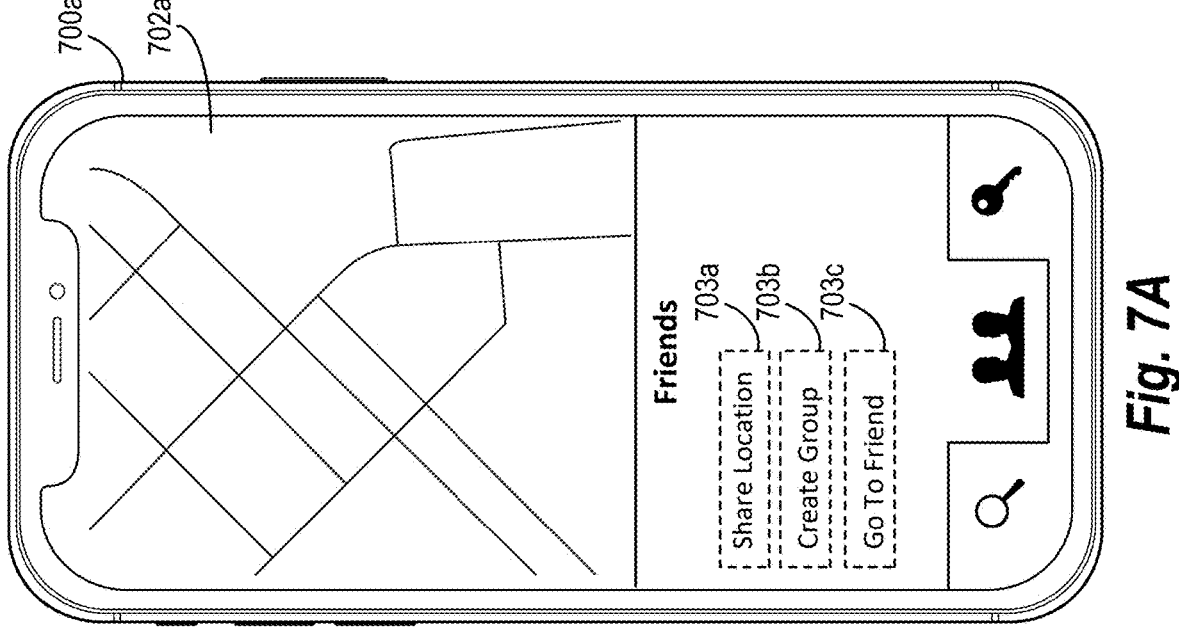
Figure 7D:
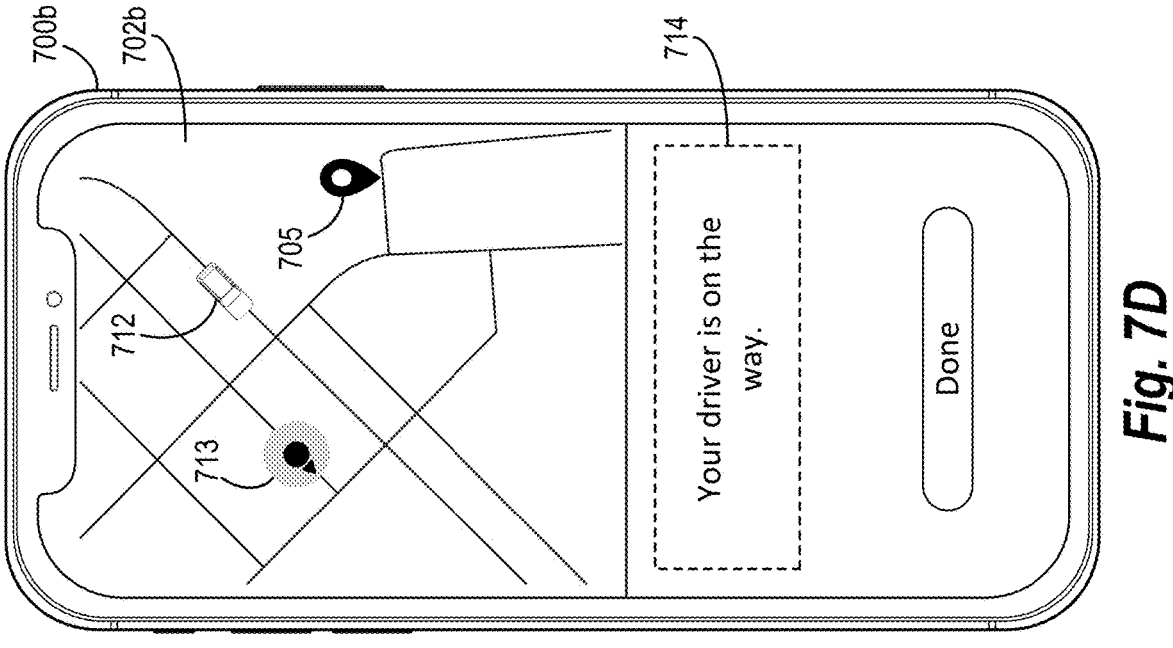
Figure 7C:
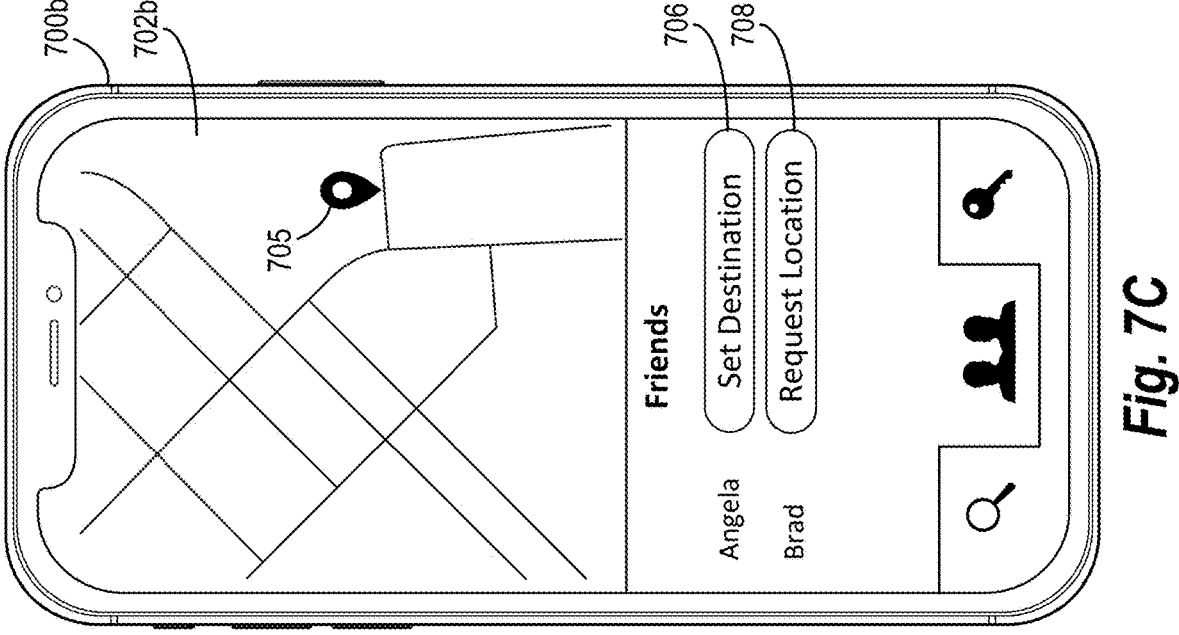

As previously described, the transportation matching system 102 can share destination location data among users of the transportation matching system 102. FIGS. 7A-7D illustrate the transportation matching system 102 providing data for graphical user interfaces presented by a plurality of requester devices (a first requester device 700a and a second requester device 700b) for sharing location data in connection with transportation requests. Specifically, FIGS. 7A-7B illustrate the first requester device 700a displaying a graphical user interface, and FIGS. 7C-7D illustrate the second requester device 700b displaying a series of graphical user interfaces.

For example, FIG. 7A illustrates the first requester device 700a displaying a graphical user interface of a requester application 702a that facilitates transportation quests via the transportation matching system 102. As shown, the first requester device 700a can display, within a graphical user interface of the requester application 702a, a plurality of options for sharing location data with other users of the transportation matching system 102 and requesting transportation requests in connection with other users. For example, FIG. 7A illustrates a share-location option 703a to share location data with one or more other users, a requester-group option 703b to create a group of requesters involving one or more other users, and a travel-to-contact option 703c to submit a transportation request to travel to a location of another user.

In response to a selection of the share-location option 703a, for example, FIG. 7B illustrates the requester device 700a displaying a graphical user interface of the requester application 702a for selecting one or more other users of the transportation matching system 102 to share location data. Specifically, the transportation matching system 102 can utilize a list of contacts or users associated with the requester corresponding to the requester device 700a to populate a set of users 704 as potential users or contacts from which a requester may select to share the requester's location. For example, the transportation matching system 102 can obtain one or more users in the set of users 704 from a list of contacts on the requester device 700a. Additionally, the transportation matching system 102 can obtain one or more users in the set of users 704 from a requester account at the transportation matching system 102. Furthermore, the transportation matching system 102 can obtain one or more users in the set of users 704 based on manual user input.

Along with providing the set of users 704 to the requester via the requester device 700a, the transportation matching system 102 can identify one or more selected users with which to share a location. For example, FIG. 7B illustrates the requester device 700a detecting an input to select a user and then mark the selected user within a graphical user interface of the requester application 702a. The requester can thus interact with the requester device 700a to select any number of users in the list. Additionally, the transportation matching system 102 can limit sharing of the location to a specific time period and may automatically update the shared location (e.g., if the requester location moves) during the time period. Alternatively, the transportation matching system 102 can use a general preference setting to always share location data with one or more users associated with the requester.

The transportation matching system 102 can also determine a location to share with one or more of the set of users 704. For instance, in one or more embodiments, the transportation matching system 102 can share a current location of the requester (e.g., based on a GPS location of the requester device 700a) with selected users from the set of users 704 (indicated by the check marks in FIG. 7B). In another example, the transportation matching system 102 can share a requester-indicated location with the selected user(s) (e.g., a location to which the requester will be traveling). More specifically, the transportation matching system 102 can detect a selected location based on a user input within a map interface or search interface. In any case, the transportation matching system 102 can then provide the requester location or requester-indicated location to one or more devices of the selected user(s).

As indicated above, FIG. 7C illustrates the transportation matching system 102 providing a shared location to the second requester device 700b, which is associated with a selected user ("second requester") from the set of users 704 in FIG. 7B. In one or more embodiments, the second requester device 700b can display, within a graphical user interface of a requester application 702b, a map icon 705 corresponding to the shared location. The second requester device 700b can thus display the selected location, which may be a location of the requester or a location selected by the requester. The second requester device 700b can also determine and display trending destination locations for the second requester based on the location of the requester or the location selected by the requester.

Additionally, the second requester device 700b can further provide options to request transportation services based on shared location data associated with one or more users associated with the second requester. In particular, FIG. 7C illustrates the second requester device 700b displaying a selectable destination option 706 for any user that has shared a location with the second requester. Furthermore, FIG. 7C illustrates the second requester device 700b displaying a selectable request option 708 to request a location from any user that is not sharing location data with the second requester (e.g., using the travel-to-contact option 703c of FIG. 7A). Thus, the transportation matching system 102 can provide a number of different ways for users to share and request location data.

In response to the second requester selecting the selectable destination option 706 of FIG. 7C, the transportation matching system 102 can initiate a request for transportation services for the second requester. To illustrate, FIG. 7D illustrates the transportation matching system 102 matching the transportation request with a provider vehicle (represented by the vehicle icon 712) for a destination location determined based on the shared location data. The transportation matching system 102 can then dispatch the provider vehicle to a current location of the second requester (indicated by the user icon 713) to transport the second requester to the shared location corresponding to the map icon 705. FIG. 7D further illustrates the second requester device 700b displaying a message 714 indicating that the transportation request is matched to a provider vehicle. Thus, the transportation matching system 102 can provide a fast and efficient way for users to share locations and request transportation services based on shared locations.

Figure 8B:
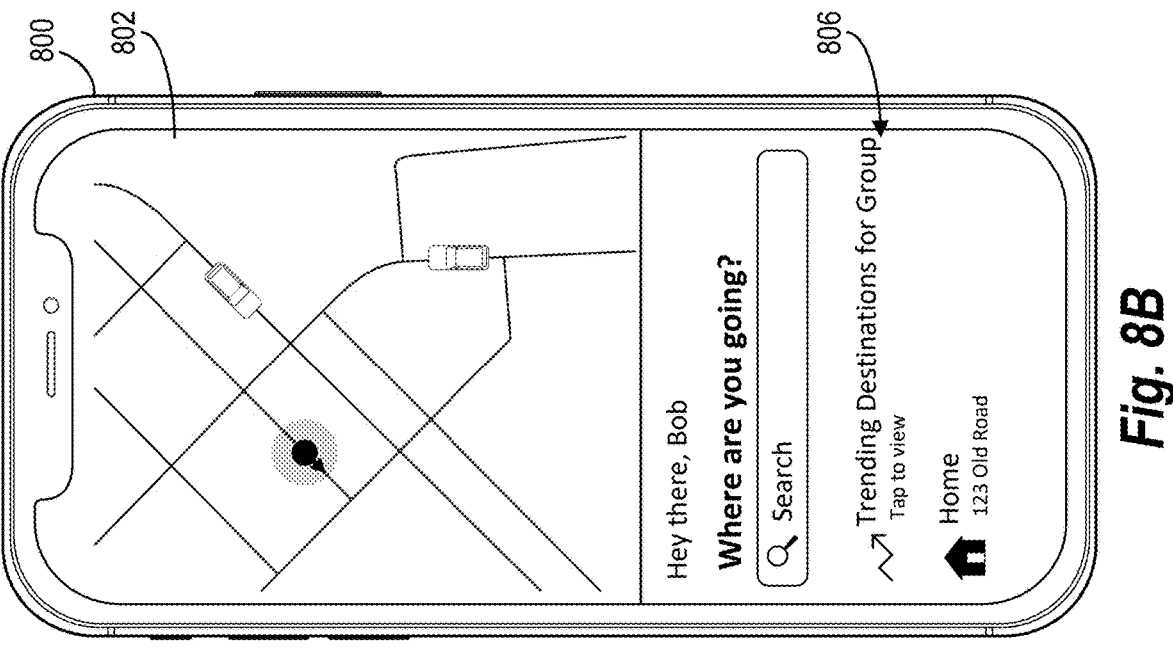
FIGS. 8A-8D illustrate a requester device presenting graphical user interfaces for requesting transportation for a group of requesters in accordance with one or more embodiments.

In addition to sharing locations among different requesters, the transportation matching system 102 can also provide trending destination locations for a plurality of requesters. To illustrate, FIGS. 8A-8E illustrate the transportation matching system 102 providing trending destination locations for a plurality of requesters within a group. FIGS. 8A-8D illustrate graphical user interfaces of a requester device 800. FIG. 8E illustrates the transportation matching system 102 establishing a plurality of transportation requests for the group of requesters if two or more of the requesters are at different locations.

Figure 8A:
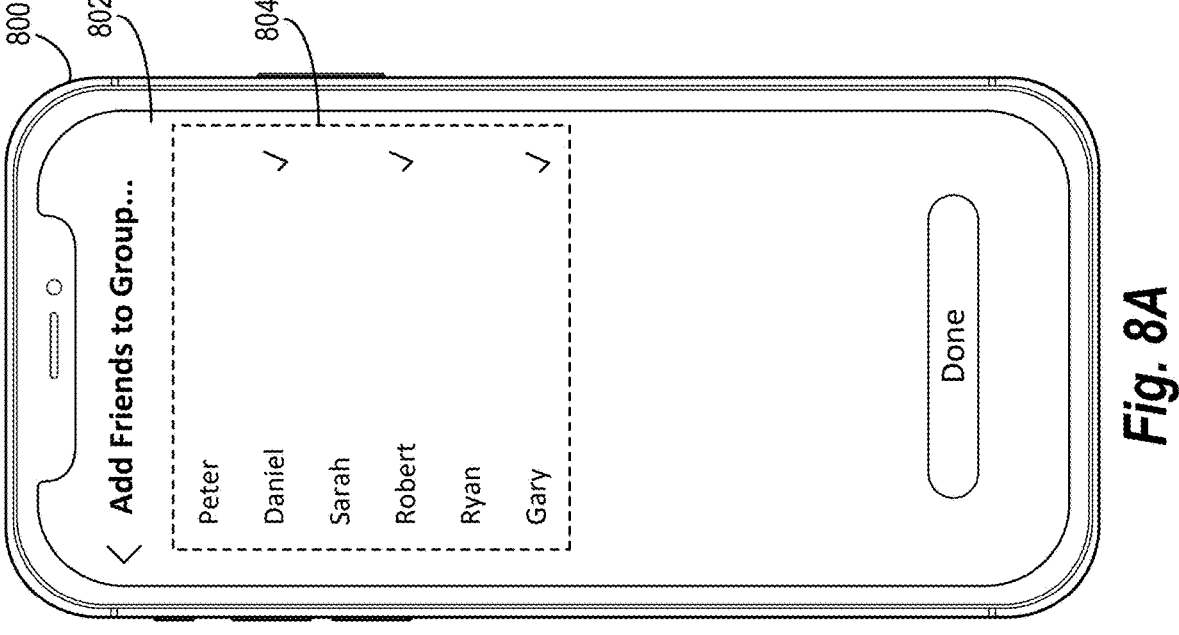

For instance, FIG. 8A illustrates the requester device 800 displaying a graphical user interface of a requester application 802 to facilitate the creation of a group of requesters. For example, the requester device 800 can display a set of users 804 associated with a requester corresponding to the requester device 800 (e.g., in response to a selection of the requester-group option 703b of FIG. 7A). The requester device 800 can detect a selection of one or more of the other users to add to a group of requesters based on user interactions with the set of users 804. The transportation matching system 102 can then identify the group based on the selected users.

The transportation matching system 102 can then determine trending destination locations for the group of requesters. For example, the transportation matching system 102 can select trending destination locations for the group of requesters based on destination locations associated with transportation requests within a geographic region associated with the group of requesters. To illustrate, the geographic region may be centered around one of the requesters (e.g., the requester associated with the requester device 800) or based on an averaged location of the requesters in the group. The transportation matching system 102 can then determine the trending destination locations based on the transportation histories and/or preferences of all requesters in the group of requesters.

As shown in FIG. 8B, after determining the trending destination locations for the group of requesters, the transportation matching system 102 can provide a selectable trend option 806 for display within a graphical user interface of the requester application 802 for the requester device 800. For instance, the requester device 800 can display the selectable trend option 806 within a map overlay on top of a map interface within the requester application 802. As depicted by the transition from FIGS. 8B to 8C, the requester device 800 can detect an interaction with the selectable trend option 806 and then display a set of trending destination locations 808 for the group of requesters within a graphical user interface of the requester application 802, illustrated in FIG. 8C.

As mentioned, the set of trending destination locations 808 for the group of requesters can include trending destinations that may be of interest to all of the requesters in the group (e.g. based on an output of one or more classification models). In other embodiments, the transportation matching system 102 can include trending destination locations within the set of trending destination locations 808 that may be of interest to a majority of the requesters in the group. The transportation matching system 102 can also provide more than one set of trending destination locations and/or filter the set of trending destination locations 808 to view different trending destination locations that may be of interest to different requesters in the group.

Figure 8D:
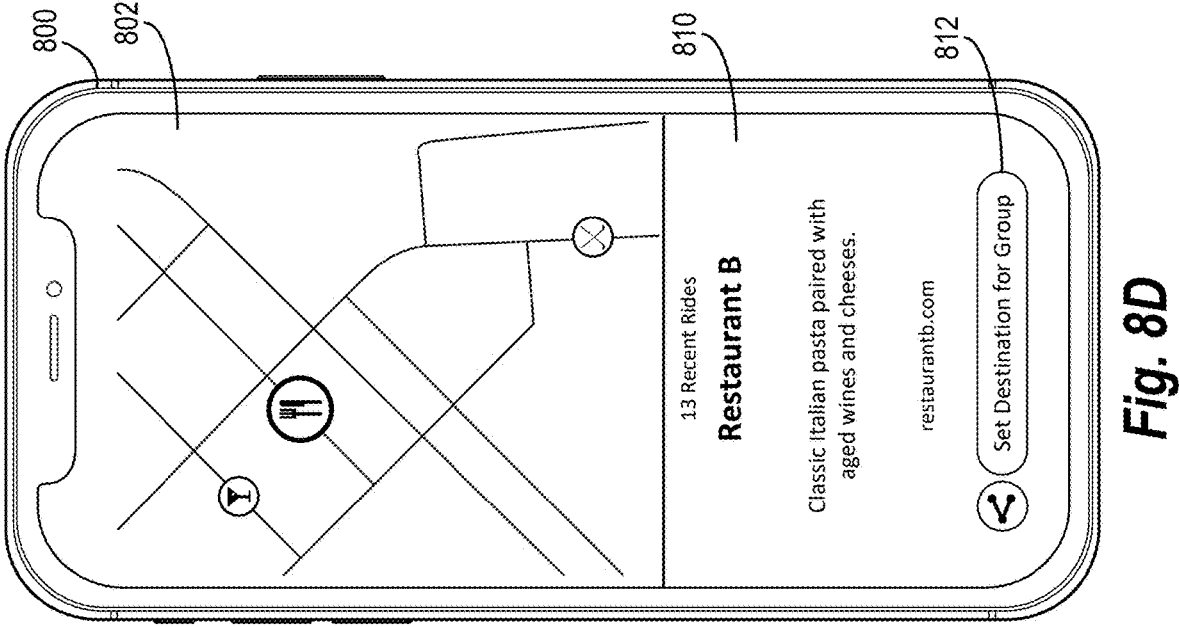
Figure 8C:
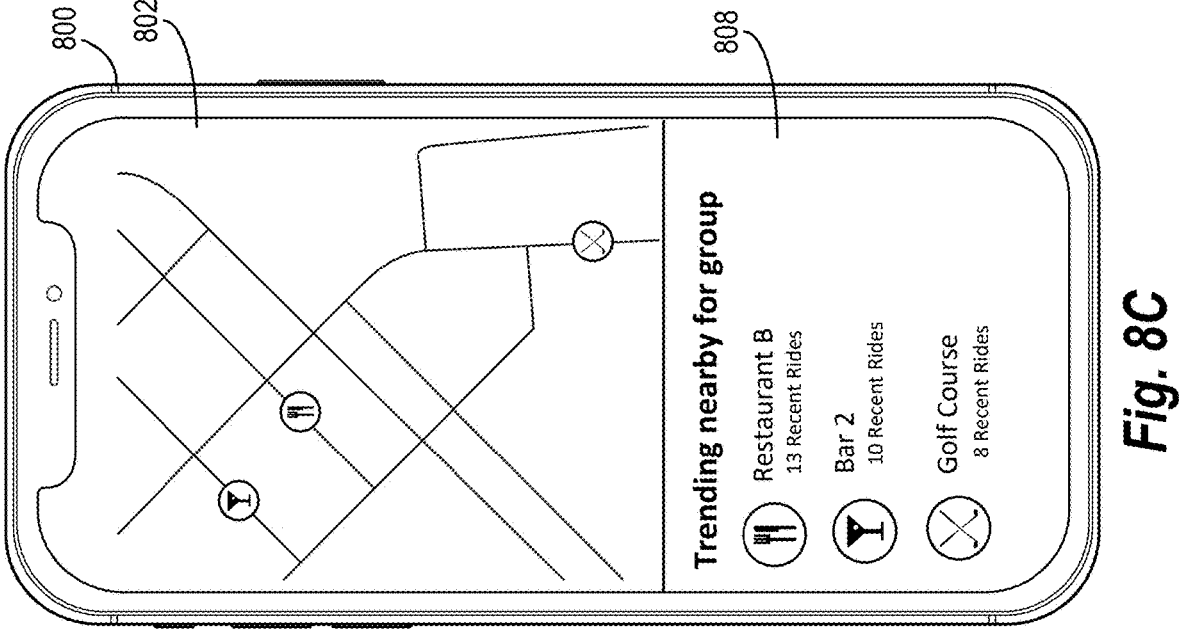
Figure 8E:
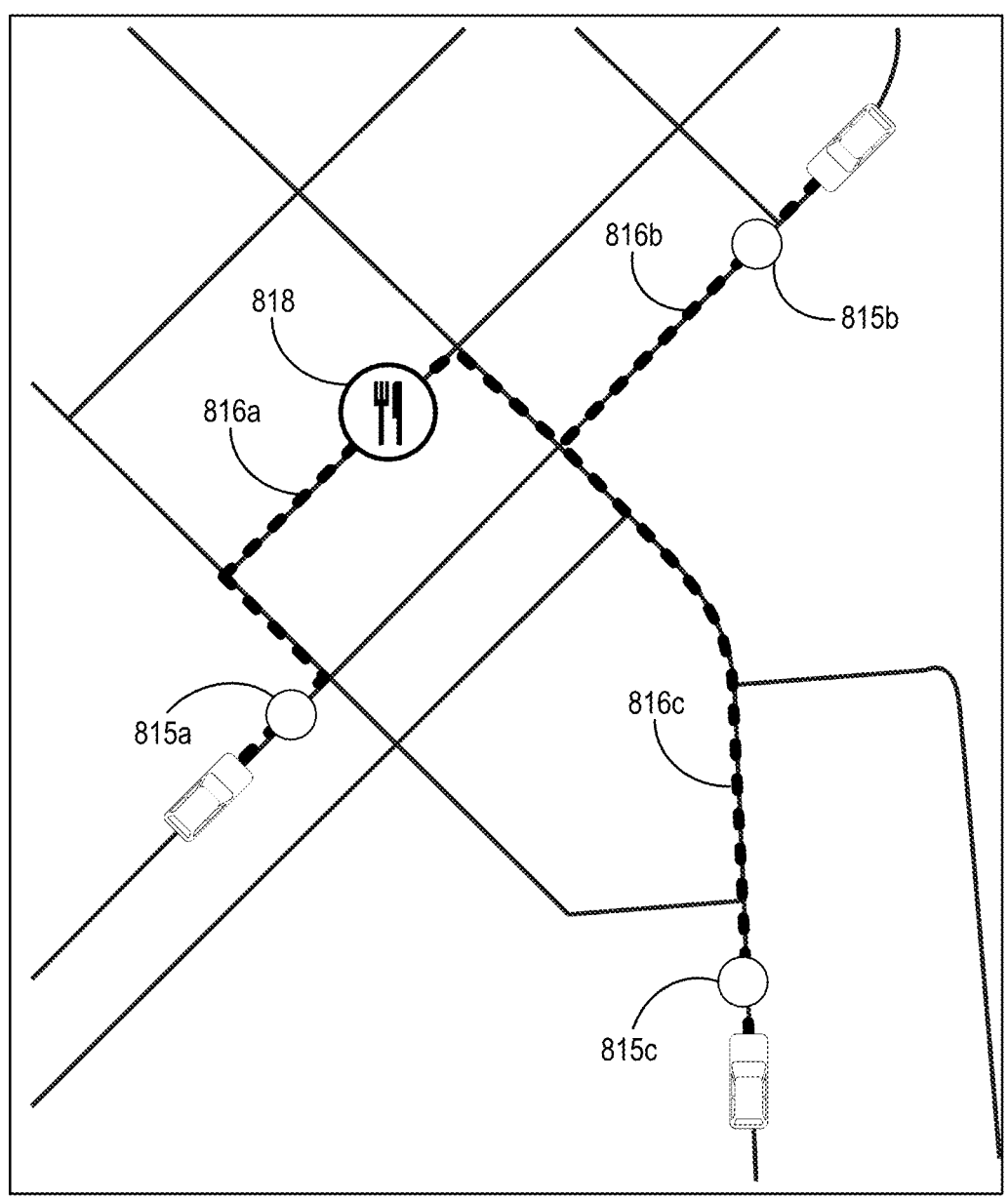
FIG. 8E illustrates transportation routes for a group of requesters traveling to a destination location in accordance with one or more embodiments.

FIG. 8D illustrates the requester device 800 displaying additional information associated with a trending destination location in response to a selection of one of the trending destination locations (e.g., in a digital card 810). Furthermore, the requester device 800 can display a selectable destination option 812 associated with a selected trending destination location. More specifically, the selectable destination option 812 can be associated with a function to submit a plurality of transportation requests for the plurality of requesters in the group.

In response to detecting a selection of the selectable destination option 812, the transportation matching system 102 can match the group of requesters with one or more provider vehicles. For example, the transportation matching system 102 can match the transportation requests to one or more provider vehicles (e.g., by sending a vehicle-transportation to a provider device associated with a provider vehicle) based on the locations of the requesters in the group and the selected trending destination location. FIG. 8E illustrates an embodiment of the transportation matching system 102 generating a plurality of transportation routes 816a-816c for transporting a plurality of requesters from requester locations 815a-815c to a destination location 818 selected from a set of trending destination locations for a group of requesters.

In one or more embodiments, the transportation matching system 102 can dispatch a provider vehicle to each of the locations of the requesters to arrive at the destination location 818 at approximately the same time (e.g., within a threshold time range of a particular requester's arrival at the destination location 818). For example, the transportation matching system 102 can determine estimated travel times from the requester locations 815a-815c from the group (e.g., the current locations of the requester devices or indicated pick-up locations from the transportation requests). The transportation matching system 102 can also determine locations and availability of nearby provider vehicles. Based on the estimated travel times and availability of nearby provider vehicles, the transportation matching system 102 can dispatch selected provider vehicles to the pick-up locations of the requesters such that the provider vehicles arrive at the destination location 818 at approximately the same time according to the estimated travel times of the various transportation routes involved in the transportation requests for the group.

Additionally, or alternatively, in some embodiments, the transportation matching system 102 dispatches a single provider vehicle to a plurality of pick-up locations of requesters in a group. The transportation matching system 102 can determine whether to dispatch one or more provider vehicles to two different pick-up locations of requesters in a group based on the proximity of the pick-up locations, distance to the destination location 818 from each of the pick-up locations, traffic, estimated arrival time relative to one or more other transportation routes associated with the group of requesters, estimated travel time associated with dispatching a single vehicle to both locations relative to estimated arrival times associated with dispatching separate vehicles to each location, or other criteria that may affect the travel time and/or arrival time at the destination location 818.

For example, the transportation matching system 102 can determine whether to dispatch a single provider vehicle to transport a first requester and a second requester in a group, including determining that the pick-up location of the second requester is between a pick-up location of the first requester and a selected destination location for the group. The transportation matching system 102 can also determine whether modifying the transportation route to the pick-up location of the second requester maintains the estimated arrival time of the first and second requesters at the destination location (e.g., based on traffic and distance) within a threshold time period of an arrival time of a third requester in the group. The transportation matching system 102 can then adjust a transportation route between the pick-up location of the first requester and the destination location to pick up the second requester.

Furthermore, the transportation matching system 102 can determine how to split payments for transportations of a group of requesters. For example, in one or more embodiments, the transportation matching system 102 can sum the total payment amounts for all of the transportations and then split the payment amounts evenly among the requesters in the group. Alternatively, the transportation matching system 102 can split the total payment amounts proportionally among the requesters based on a distance and/or time traveled by each requester.

Figure 9:
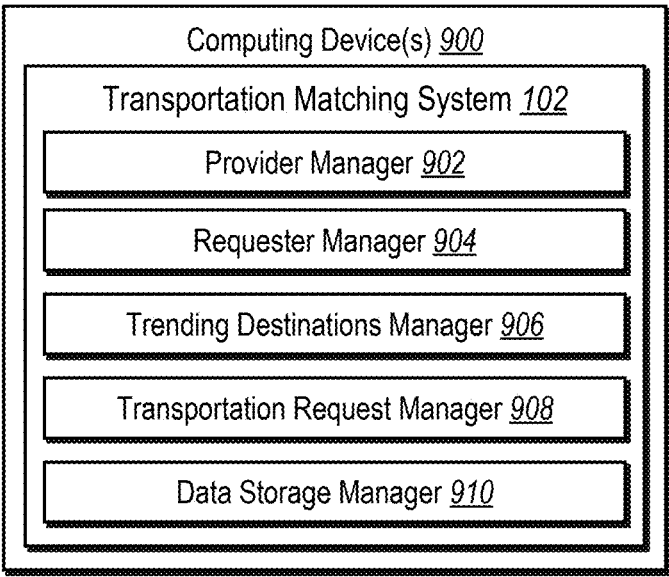
FIG. 9 illustrates a block diagram of the transportation matching system of FIG. 1 in accordance with one or more embodiments.

FIG. 9 illustrates a detailed schematic diagram of an example embodiment of the transportation matching system 102 described above. As shown, the transportation matching system 102 can be implemented on computing device(s) 900 (e.g., a server device and/or a client device), as further described below in relation to FIG. 11. Additionally, the transportation matching system 102 can include, but is not limited to, a provider manager 902, a requester manager 904, a trending destinations manager 906, a transportation request manager 908, and a data storage manager 910. For example, the transportation matching system 102 can be implemented in a distributed system of server devices for managing servicing of vehicles associated with transportation providers. The transportation matching system 102 can also be implemented within one or more additional systems. Alternatively, the transportation matching system 102 can be implemented on a single computing device such as a single client device.

In one or more embodiments, each of the components of the transportation matching system 102 is in communication with other components using any suitable communication technologies. Additionally, the components of the transportation matching system 102 can be in communication with one or more other devices including other computing devices of a user, server devices (e.g., cloud storage devices), licensing servers, or other devices/systems. It will be recognized that although the components of the transportation matching system 102 are shown to be separate in FIG. 9, any of the subcomponents may be combined into fewer components, such as into a single component, or divided into more components as may serve a particular implementation. Furthermore, although the components of FIG. 9 are described in connection with the transportation matching system 102, at least some of the components for performing operations in conjunction with the transportation matching system 102 described herein may be implemented on other devices within the environment.

The components of the transportation matching system 102 can include software, hardware, or both. For example, the components of the transportation matching system 102 can include one or more instructions stored on a computer-readable storage medium and executable by processors of one or more computing devices (e.g., the computing device (s) 900). When executed by the one or more processors, the computer-executable instructions of the transportation matching system 102 can cause the computing device(s) 900 to perform the operations described herein. Alternatively, the components of the transportation matching system 102 can include hardware, such as a special purpose processing device to perform a certain function or group of functions. Additionally, or alternatively, the components of the transportation matching system 102 can include a combination of computer-executable instructions and hardware.

Furthermore, the components of the transportation matching system 102 performing the functions described herein with respect to the transportation matching system 102 may, for example, be implemented as part of a stand-alone application, as a module of an application, as a plug-in for applications, as a library function or functions that may be called by other applications, and/or as a cloud-computing model. Thus, the components of the transportation matching system 102 may be implemented as part of a stand-alone application on a personal computing device or a mobile device.

As described above, the transportation matching system 102 can include a provider manager 902 to facilitate the management of provider vehicles and provider devices. For example, the provider manager 902 can maintain a database of provider vehicle data, including, but not limited to, provider vehicle identifiers, maintenance information, transportation route information, or location information. The provider manager 902 can also maintain a database of provider device and transportation provider information including, but not limited to, provider profiles, corresponding provider vehicles, and other data that the transportation matching system 102 can use in providing transportation services.

The transportation matching system 102 can also include a requester manager 904 to manage data associated with requesters of transportation services. To illustrate, the requester manager 904 can manage requester data for matching transportation requests with provider vehicles. The requester manager 904 can, for example, manage requester profiles that include, but are not limited to, transportation histories, preferences, location data, user interests, or other information relevant for fulfilling transportation requests. The requester manager 904 can also facilitate the sharing of data between requesters. Additionally, the requester manager 904 can also facilitate groups of requesters in connection with transportation requests.

Additionally, the transportation matching system 102 can include a trending destinations manager 906 to manage trending destination locations for requesters. Specifically, the trending destinations manager 906 can facilitate the generation of sets of trending destination locations via the use of one or more classification models and/or algorithms to count the number of transportation requests associated with destination locations within various geographic regions. Additionally, the trending destinations manager 906 can utilize manually curated information (e.g., a manually approved list of locations or location categories) to determine trending destination locations.

The transportation matching system 102 can also include a transportation request manager 908. The transportation request manager 908 can manage transportation requests from requester devices by matching the transportation requests with provider devices and/or provider vehicles. The transportation request manager 908 can communicate with one or more other components (e.g., the provider manager 902 and the requester manager 904) to identify location data of requester devices and provider devices for fulfilling transportation requests. Additionally, the transportation request manager 908 can provide data to the trending destinations manager 906 for use in determining real-time (or near-real-time) trending destination locations to provide to requesters.

The transportation matching system 102 can also include a data storage manager 910 (that comprises a non-transitory computer memory/one or more memory devices) to facilitate storage of data associated with matching provider vehicles with transportation requests and providing trending destination locations to requesters. The data storage manager 910 can communicate with any of the other components of the transportation matching system 102 to obtain and/or provide data. For example, the data storage manager 910 can store data related to provider vehicles, provider devices, provider profiles, requester devices, requester profiles, transportation histories, classification models, destination location categories/details, and curated trending destination location lists.

Figure 10:
FIG. 10 illustrates a flowchart of a series of acts in a method of presenting trending destination locations in a graphical user interface in accordance with one or more embodiments.
Figure 10:
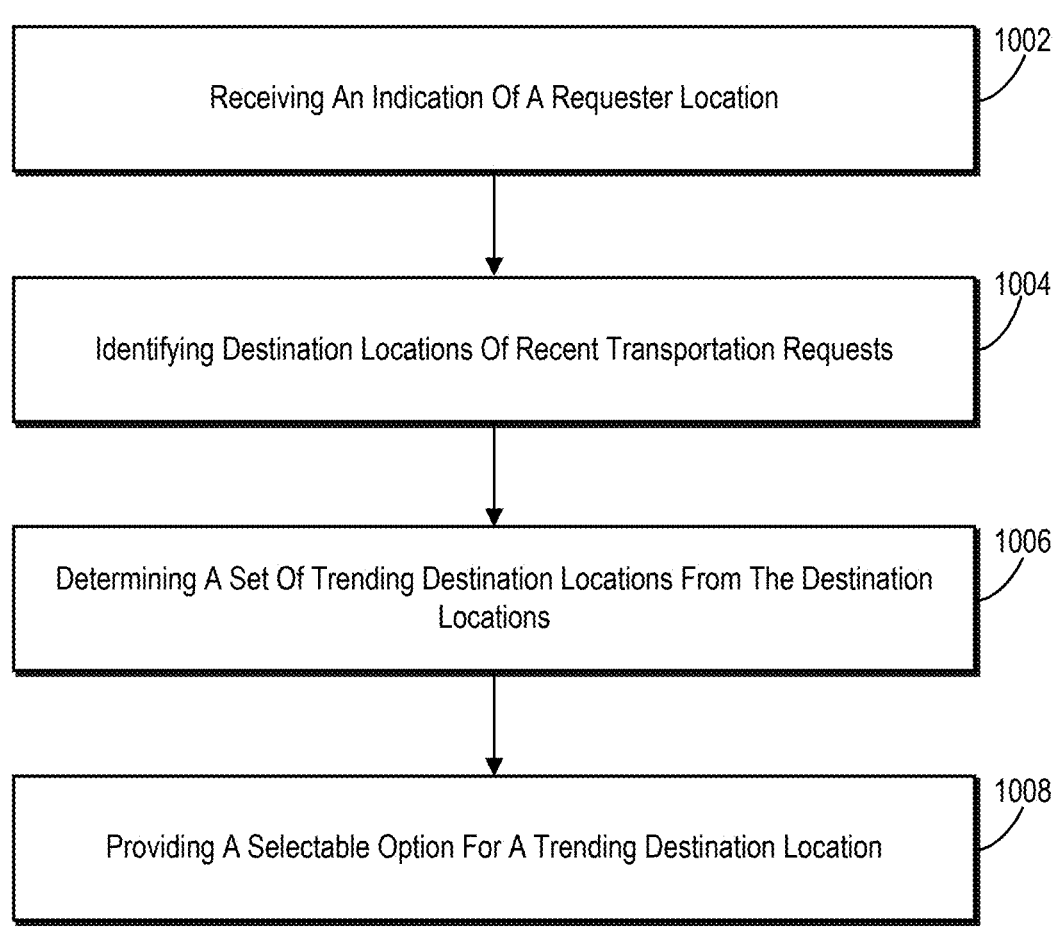

Turning now to FIG. 10, this figure shows a flowchart of a series of acts 1000 of using transportation data to determine trending destination locations for requesters. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system can perform the acts of FIG. 10.

As shown, the series of acts 1000 includes an act 1002 of receiving an indication of a requester location. For example, act 1002 involves receiving, from a requester device, an indication of a requester location for a requester. Act 1002 can further involve determining the requester location in response to receiving an indication of a GPS location of the requester device or an indication of the requester location based on a wireless connectivity of the requester device. Act 1002 can alternatively involve determining the requester location based on a user-selected location.

The series of acts 1000 also includes an act 1004 of identifying destination locations of recent transportation requests. For example, act 1004 involves identifying, from within a geographic region of the requester location, destination locations of transportation requests received within a threshold time period of a current reference time for the requester. Act 1004 can involve identifying destination locations of completed transportations associated with transportation requests within the threshold time period. Act 1004 can involve identifying destination locations of transportation requests completed and ongoing within the threshold time period.

Additionally, the series of acts 1000 includes an act 1006 of determining a set of trending destination locations from the destination locations. For example, act 1006 involves determining a set of trending destination locations from the destination locations based on one or more transportation requests received within the threshold time period to each of the destination locations.

Act 1006 can involve identifying a transportation history of destination locations for the requester. Act 1006 can then involve determining the set of trending destination locations based on the transportation history of destination locations for the requester. For example, act 1006 can involve utilizing a classification model to determine the set of trending destination locations based on the transportation history of destination locations for the requester. Act 1006 can involve utilizing the classification model with parameters learned based on a dataset of training time periods, destination locations of previous transportation requests by other requesters, and the transportation history of destination locations for the requester.

As part of act 1006, the series of acts 1000 can further include determining that the requester and an additional requester associated with the requester within the geographic region of the requester location are in a group. Act 1006 can also involve identifying a transportation history of destination locations for the additional requester. Act 1006 can then involve determining the set of trending destination locations based on the transportation history of destination locations for the requester and the transportation history of destination locations for the additional requester.

Additionally, act 1006 can involve identifying a category of destination locations for the requester. Act 1006 can also involve determining the set of trending destination locations according to the category of destination locations. For example, act 1006 can involve determining one or more categories of destination locations to exclude from the set of trending destination locations. Act 1006 can also involve determining the set of trending destination locations based on a manually curated set of destination locations.

The series of acts 1000 further includes an act 1008 of providing a selectable option for a trending destination location. For example, act 1008 involves providing, for display within a graphical user interface of the requester device, a selectable option for a trending destination location from the set of trending destination locations. Additionally, act 1008 can involve providing the selectable option to initiate a transportation request with the trending destination location from the set of trending destination locations as a destination location of the transportation request.

Additionally, the series of acts 1000 can include receiving, from the requester device, an indication of a selection of the selectable option for the trending destination location. The series of acts 1000 can also include sending, to a provider device, a vehicle-transportation request to transport the requester to the trending destination location based on the requester location and the selection of the selectable option for the trending destination location.

The series of acts 1000 can also include receiving, from the requester device, an indication of a user-identified destination location. For example, the user-identified destination location can include a location other than a location of the requester device. The series of acts 1000 can then include providing, to an additional requester device of an additional requester associated with the requester, the user-identified destination location as a selectable map marker within a map interface. Additionally, the series of acts 1000 can include providing, to an additional requester device of an additional requester associated with the requester, a requester location based on a location of the requester device as a selectable map marker within a map interface.

In one or more embodiments, the series of acts 1000 can include identifying a merchant location sponsored by a merchant within the geographic region of the requester location. For example, the series of acts 1000 can include identifying a merchant location based on an integration with a merchant system of the merchant with an application program interface. The series of acts 1000 can then include providing, for display within the graphical user interface of the requester device, an additional selectable option for the merchant location as a destination location and a transportation-incentive indicator for a transportation incentive for the requester to travel to the merchant location. For example, the series of acts 1000 can include providing an indication of a modification to a transportation request to travel to the merchant location. In one or more embodiments, the modification can include a discount applied to the transportation request in response to determining that the requester completed a payment transaction at the merchant location.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
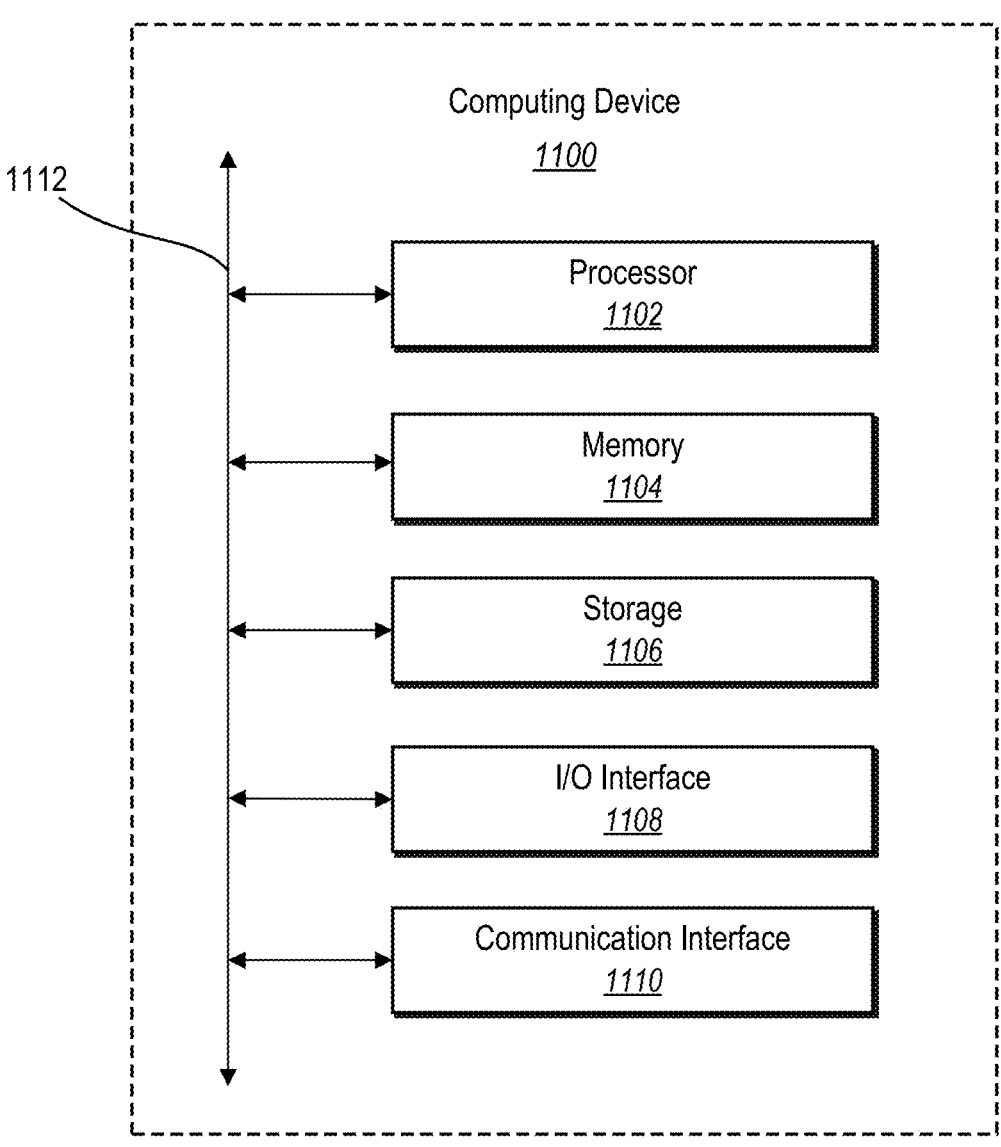
FIG. 11 illustrates a block diagram of a computing device in accordance with one or more embodiments.

FIG. 11 illustrates, in block diagram form, an exemplary computing device 1100 that may be configured to perform one or more of the processes described above. One will appreciate that the transportation matching system 102 can comprise implementations of the computing device 1100, including, but not limited to, the devices or systems illustrated in the previous figures. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive ("HDD"), flash memory, a Universal Serial Bus ("USB") drive or a combination of these or other storage devices.

The computing device 1100 also includes one or more input or output ("I/O") interface 1108, which are provided to allow a user (e.g., requester or provider) to provide input to (such as user strokes), receive output from, and otherwise transfer data to and from the computing device 1100. These I/O interface 1108 may include a mouse, keypad or a keyboard, a touch screen, camera, optical scanner, network interface, modem, other known I/O devices or a combination of such I/O interface 1108. The touch screen may be activated with a stylus or a finger.

The I/O interface 1108 may include one or more devices for presenting output to a user, including, but not limited to, a graphics engine, a display (e.g., a display screen), one or more output providers (e.g., display providers), one or more audio speakers, and one or more audio providers. In certain embodiments, interface 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include a bus 1112. The bus 1112 can comprise hardware, software, or both that couples components of computing device 1100 to each other.

Figure 12:
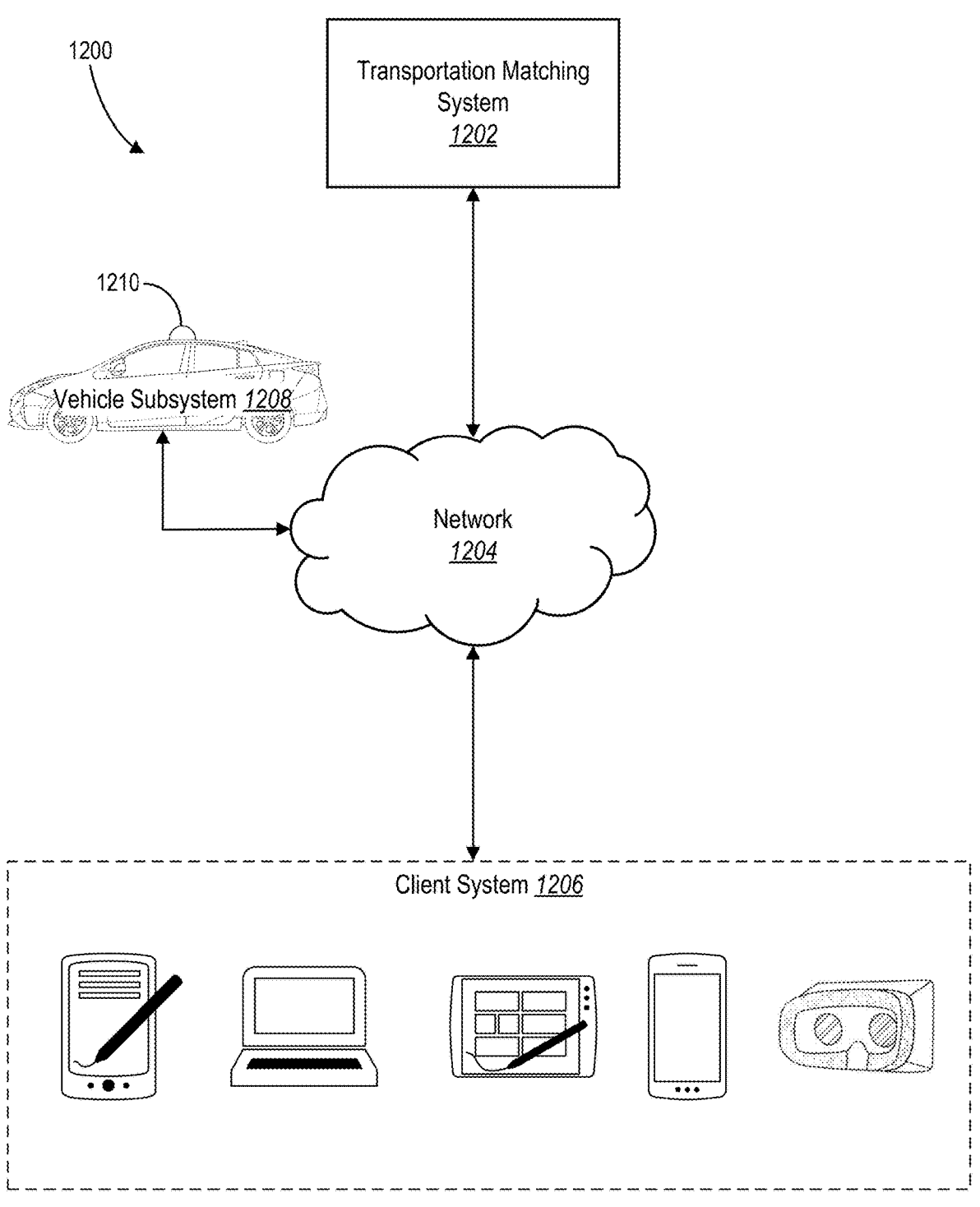
FIG. 12 illustrates an example environment for a transportation matching system in accordance with one or more embodiments.

FIG. 12 illustrates an example network environment 1200 of a transportation matching system 1202. The network environment 1200 includes a client device 1206, a transportation matching system 1202, and a vehicle subsystem 1208 connected to each other by a network 1204. Although FIG. 12 illustrates a particular arrangement of the client device 1206, transportation matching system 1202, vehicle subsystem 1208, and network 1204, this disclosure contemplates any suitable arrangement of client device 1206, transportation matching system 1202, vehicle subsystem 1208, and network 1204. As an example, and not by way of limitation, two or more of client device 1206, transportation matching system 1202, and vehicle subsystem 1208 communicate directly, bypassing network 1204. As another example, two or more of client device 1206, transportation matching system 1202, and vehicle subsystem 1208 may be physically or logically co-located with each other in whole or in part. Moreover, although FIG. 12 illustrates a particular number of client devices 1206, transportation matching systems 1202, vehicle subsystems 1208, and networks 1204, this disclosure contemplates any suitable number of client devices 1206, transportation matching systems 1202, vehicle subsystems 1208, and networks 1204. As an example, and not by way of limitation, network environment 1200 may include multiple client device 1206, transportation matching systems 1202, vehicle subsystems 1208, and networks 1204.

This disclosure contemplates any suitable network 1204. As an example, and not by way of limitation, one or more portions of network 1204 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1204 may include one or more networks 1204.

Links may connect client device 1206, transportation matching system 1202, and vehicle subsystem 1208 to network 1204 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client device 1206 may be an electronic device including hardware, software, or embedded logic components or a combination of two or more such components and capable of carrying out the appropriate functionalities implemented or supported by client device 1206. As an example, and not by way of limitation, a client device 1206 may include any of the computing devices discussed above in relation to FIG. 11. A client device 1206 may enable a network user at client device 1206 to access network 1204. A client device 1206 may enable its user to communicate with other users at other client devices 1206.

In particular embodiments, client device 1206 may include a requester application or a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client device 1206 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 1206 one or more Hyper Text Markup Language ("HTML") files responsive to the HTTP request. Client device 1206 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 1202 may be a network-addressable computing system that can host a transportation matching network. Transportation matching system 1202 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 1202. In addition, the transportation matching system may manage identities of service requesters such as users/requesters. In particular, the transportation matching system 1202 may maintain requester data such as driving/riding histories, personal data, or other user data in addition to navigation and/or traffic management services or other location services (e.g., GPS services).

In particular embodiments, the transportation matching system 1202 may manage transportation matching services to connect a user/requester with a vehicle and/or provider. By managing the transportation matching services, the transportation matching system 1202 can manage the distribution and allocation of resources from the vehicle subsystem 1208 and user resources such as GPS location and availability indicators, as described herein.

Transportation matching system 1202 may be accessed by the other components of network environment 1200 either directly or via network 1204. In particular embodiments, transportation matching system 1202 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, transportation matching system 1202 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, or a transportation matching system 1202 to manage, retrieve, modify, add, or delete, the information stored in data store.

In particular embodiments, transportation matching system 1202 may provide users with the ability to take actions on various types of items or objects, supported by transportation matching system 1202. As an example, and not by way of limitation, the items and objects may include transportation matching networks to which users of transportation matching system 1202 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in transportation matching system 1202 or by an external system of a third-party system, which is separate from transportation matching system 1202 and coupled to transportation matching system 1202 via a network 1204.

In particular embodiments, transportation matching system 1202 may be capable of linking a variety of entities. As an example, and not by way of limitation, transportation matching system 1202 may enable users to interact with each other or other entities, or to allow users to interact with these entities through an application programming interfaces ("API") or other communication channels.

In particular embodiments, transportation matching system 1202 may include a variety of servers, sub-systems, programs, modules, logs, and data stores. In particular embodiments, transportation matching system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Transportation matching system 1202 may also include suitable components such as network interfaces, security mechanisms, load balancers, failover servers, management-and-network-operations consoles, other suitable components, or any suitable combination thereof. In particular embodiments, transportation matching system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between transportation matching system 1202 and one or more client devices 1206. An action logger may be used to receive communications from a web server about a user's actions on or off transportation matching system 1202. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from client device 1206 responsive to a request received from client device 1206. Authorization servers may be used to enforce one or more privacy settings of the users of transportation matching system 1202. A privacy setting of a user determines how particular information associated with a user can be shared. The authorization server may allow users to opt in to or opt out of having their actions logged by transportation matching system 1202 or shared with other systems, such as, for example, by setting appropriate privacy settings. Third-party-content-object stores may be used to store content objects received from third parties. Location stores may be used for storing location information received from client devices 1206 associated with users.

In addition, the vehicle subsystem 1208 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1208 can include an autonomous vehicle—i.e., a vehicle that does not require a human operator. In these embodiments, the vehicle subsystem 1208 can perform maneuvers, communicate, and otherwise function without the aid of a human provider, in accordance with available technology.

In particular embodiments, the vehicle subsystem 1208 may include one or more sensors incorporated therein or associated thereto. For example, sensor(s) 1210 can be mounted on the top of the vehicle subsystem 1208 or else can be located within the interior of the vehicle subsystem 1208. In certain embodiments, the sensor(s) 1210 can be located in multiple areas at once—i.e., split up throughout the vehicle subsystem 1208 so that different components of the sensor(s) 1210 can be placed in different locations in accordance with optimal operation of the sensor(s) 1210. In these embodiments, the sensor(s) 1210 can include a LIDAR sensor and an inertial measurement unit ("IMU") including one or more accelerometers, one or more gyroscopes, and one or more magnetometers. The sensor(s) 1210 can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1208 may include a communication device capable of communicating with the client device 1206 and/or the transportation matching system 1202. For example, the vehicle subsystem 1208 can include an on-board computing device communicatively linked to the network 1204 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A system comprising:

at least one processor; and a non-transitory computer readable storage medium comprising instructions that, when executed by the at least one processor, cause the system to:

receive, from a requester device in response to the requester device opening a requester application, an indication of a requester location for a requester;

determine, for a geographic region of the requester location, destination locations indicated in device requests received from a plurality of additional requester devices within a threshold time period of a current reference time for the requester;

determine, utilizing a classification model, a set of trending destination locations from the destination locations based on comparing numbers of device requests for the destination locations received within the threshold time period to a threshold number of requests for the threshold time period, wherein the classification model is trained in part by learning parameters of the classification model based on a device request history of destination locations for the requestor, historical requester destination locations within one or more geographical regions, and a plurality of user segments for a plurality of training time periods by iteratively:

generating a set of predicted trending destination locations based on the device request history, the historical requester destination locations within one or more geographical regions, and the plurality of user segments for the plurality of training time periods;

determining a loss utilizing a loss function that quantifies a difference between the set of predicted trending destination locations and ground-truth trending destination locations; and adjusting the parameters of the classification model based on the loss;

determine an additional location indicated as sponsored by a third-party system within the geographic region of the requester location; and provide for display within a mapping interface of the requester device in response to the requester device opening the requester application:

a first portion of the mapping interface comprising a map of the geographic region including an indication of the requester location;

a second portion of the mapping interface comprising a list combining the set of trending destination locations and a location indicator for the additional location; and in response to an indication of a selected location from the list, a selectable option for initiating a device match request for a trending destination location or the additional location.

2. The system of claim 1, further comprising instructions that, when executed by the at least one processor, cause the system to:

receive, from the requester device, an indication of a selection of the selectable option for initiating the device match request via the mapping interface; and send, to a provider device in response to the indication of the selection of the selectable option, a provider request comprising the trending destination location or the additional location based on the requester location.

3. The system of claim 1, further comprising instructions that, when executed by the at least one processor, cause the system to:

identify the device request history of destination locations for the requester.

4. The system of claim 1, further comprising instructions that, when executed by the at least one processor, cause the system to:

train, in a first training stage and utilizing the loss function, the classification model based on general destination location data associated with a plurality of requestors; and train, in a second training stage and utilizing the loss function, the classification model based on specific destination location data corresponding to the requester that comprises the device request history.

5. The system of claim 3, further comprising instructions that, when executed by the at least one processor, cause the system to determine the set of trending destination locations by:

determining that the requester and an additional requester associated with the requester within the geographic region of the requester location are in a group;

identifying a device request history of destination locations for the additional requester; and determining the set of trending destination locations based on the device request history of destination locations for the requester and the device request history of destination locations for the additional requester.

6. The system of claim 1, further comprising instructions that, when executed by the at least one processor, cause the system to determine the set of trending destination locations by:

identifying a category of destination locations for the requester; and determining the set of trending destination locations according to the category of destination locations.

7. The system of claim 1, further comprising instructions that, when executed by the at least one processor, cause the system to:

receive an indication of a placement of a user-identified destination location at the requester device; and generate, for display at an additional requester device of an additional requester associated with the requester, a selectable map marker representing the user-identified destination location within a mapping interface of the additional requester device in response to the indication of the placement of the user-identified destination location at the requester device.

8. The system of claim 1, further comprising instructions that, when executed by the at least one processor, cause the system to determine the destination locations indicated in the device requests received from the plurality of additional requester devices by:

receiving, from a plurality of provider devices, additional device request data corresponding to fulfilled device requests including GPS data and wireless location data of the plurality of provider devices; and verifying the destination locations indicated in the device requests utilizing the additional device request data of the fulfilled device requests.

9. A non-transitory computer readable storage medium comprising instructions that, when executed by at least one processor, cause a computing device to:

receive, from a requester device in response to the requester device opening a requester application, an indication of a requester location for a requester;

determine, for a geographic region of the requester location, destination locations indicated in device requests received from a plurality of additional requester devices within a threshold time period of a current reference time for the requester;

determine, utilizing a classification model, a set of trending destination locations from the destination locations comparing numbers of device requests for the destination locations received within the threshold time period to a threshold number of requests for the threshold time period, wherein the classification model is trained in part by learning parameters of the classification model based on a device request history of destination locations for the requestor, historical requester destination locations within one or more geographical regions, and a plurality of user segments for a plurality of training time periods by iteratively:

generating a set of predicted trending destination locations based on the device request history, the historical requester destination locations within one or more geographical regions, and the plurality of user segments for the plurality of training time periods;

determining a loss utilizing a loss function that quantifies a difference between the set of predicted trending destination locations and ground-truth trending destination locations; and adjusting the parameters of the classification model based on the loss;

determine an additional location indicated as sponsored by a third-party system within the geographic region of the requester location; and provide for display within a mapping interface of the requester device in response to the requester device opening the requester application:

a first portion of the mapping interface comprising a map of the geographic region including an indication of the requester location;

a second portion of the mapping interface comprising a list combining the set of trending destination locations and a location indicator for the additional location; and in response to an indication of a selected location from the list, a selectable option for initiating a device match request for a trending destination location or the additional location.

10. The non-transitory computer readable storage medium of claim 9, further comprising instructions that, when executed by the at least one processor, cause the computing device to:

receive, from the requester device, an indication of a selection of the selectable option for initiating the device match request via the mapping interface; and send, to a provider device in response to the indication of the selection of the selectable option, a provider request comprising the trending destination location or the additional location based on the requester location.

11. The non-transitory computer readable storage medium of claim 9, further comprising instructions that, when executed by the at least one processor, cause the computing device to:

identify the device request history of destination locations for the requester.

12. The non-transitory computer readable storage medium of claim 9, further comprising instructions that, when executed by the at least one processor, cause the computing device to:

train, in a first training stage and utilizing the loss function, the classification model based on general destination location data associated with a plurality of requestors; and train, in a second training stage and utilizing the loss function, the classification model based on specific destination location data corresponding to the requester that comprises the device request history.

13. The non-transitory computer readable storage medium of claim 11, further comprising instructions that, when executed by the at least one processor, cause the computing device to determine the set of trending destination locations by:

determining that the requester and an additional requester associated with the requester within the geographic region of the requester location are in a group;

identifying a device request history of destination locations for the additional requester; and determining the set of trending destination locations based on the device request history of destination locations for the requester and the device request history of destination locations for the additional requester.

14. The non-transitory computer readable storage medium of claim 9, further comprising instructions that, when executed by the at least one processor, cause the computing device to determine the current reference time for the requester as a time at which the requester device opens the requester application.

15. A method comprising:

receiving, from a requester device in response to the requester device opening a requester application, an indication of a requester location for a requester;

determining, for a geographic region of the requester location, destination locations indicated in devices requests received from a plurality of additional requester devices within a threshold time period of a current reference time for the requester;

determining, utilizing a classification model, a set of trending destination locations from the destination locations based on comparing numbers of device requests for the destination locations received within the threshold time period to a threshold number of requests for the threshold time period, wherein the classification model is trained in part by learning parameters of the classification model based on a device request history of destination locations for the requestor, historical requester destination locations within one or more geographical regions, and a plurality of user segments for a plurality of training time periods by iteratively:

generating a set of predicted trending destination locations based on the device request history, the historical requester destination locations within one or more geographical regions, and the plurality of user segments for the plurality of training time periods;

determining a loss utilizing a loss function that quantifies a difference between the set of predicted trending destination locations and ground-truth trending destination locations; and adjusting the parameters of the classification model based on the loss;

determining an additional location indicated as sponsored by a third-party system within the geographic region of the requester location; and providing for display within a mapping interface of the requester device in response to the requester device opening the requester application:

a first portion of the mapping interface comprising a map of the geographic region including an indication of the requester location;

a second portion of the mapping interface comprising a list combining the set of trending destination locations and a location indicator for the additional location; and in response to an indication of a selected location from the list, a selectable option for initiating a device match request for a trending destination location or the additional location.

16. The method of claim 15, further comprising:

receiving, from the requester device, an indication of a selection of the selectable option for initiating the device match request via the mapping interface; and sending, to a provider device in response to the indication of the selection of the selectable option, a provider request comprising the trending destination location or the additional location based on the requester location.

17. The method of claim 15, further comprising identifying the device request history of destination locations for the requester.

18. The method of claim 17, further comprising:

training, in a first training stage and utilizing the loss function, the classification model based on general destination location data associated with a plurality of requestors; and training, in a second training stage and utilizing the loss function, the classification model based on specific destination location data corresponding to the requester that comprises the device request history.

19. The method of claim 17, wherein determining the set of trending destination locations comprises:

determining that the requester and an additional requester associated with the requester within the geographic region of the requester location are in a group;

identifying a device request history of destination locations for the additional requester; and determining the set of trending destination locations based on the device request history of destination locations for the requester and the device request history of destination locations for the additional requester.

20. The method of claim 17, further comprising determining the current reference time for the requester as a time at which the requester device opens the requester application.

* * * * *